(12) United States Patent
Boyce

(10) Patent No.: US 12,301,869 B2
(45) Date of Patent: May 13, 2025

(54) IMMERSIVE VIDEO CODING TECHNIQUES FOR THREE DEGREE OF FREEDOM PLUS/METADATA FOR IMMERSIVE VIDEO (3DoF+/MIV) AND VIDEO-POINT CLOUD CODING (V-PCC)

(71) Applicant: INTEL CORPORATION, Santa Clara, CA (US)

(72) Inventor: Jill Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/440,534

(22) PCT Filed: May 14, 2020

(86) PCT No.: PCT/US2020/032953
§ 371 (c)(1),
(2) Date: Sep. 17, 2021

(87) PCT Pub. No.: WO2020/232281
PCT Pub. Date: Nov. 19, 2020

(65) Prior Publication Data
US 2022/0159298 A1    May 19, 2022

Related U.S. Application Data

(60) Provisional application No. 62/847,779, filed on May 14, 2019.

(51) Int. Cl.
*H04N 19/597*    (2014.01)
*G06T 7/80*    (2017.01)
(Continued)

(52) U.S. Cl.
CPC ............. *H04N 19/597* (2014.11); *G06T 7/80* (2017.01); *H04N 19/124* (2014.11); *H04N 19/159* (2014.11)

(58) Field of Classification Search
CPC ...... G06T 7/80; H04N 13/117; H04N 13/161; H04N 13/178; H04N 13/194;
(Continued)

(56) References Cited

U.S. PATENT DOCUMENTS

2015/0172544 A1    6/2015  Deng et al.
2017/0316609 A1    11/2017 Dunn et al.
(Continued)

FOREIGN PATENT DOCUMENTS

KR    10-2018-0081721    7/2018
WO    2018130491    7/2018

OTHER PUBLICATIONS

Salahieh et al., "Test Model for Immersive Video", ISO/IEC JCT I/SC 29/WG11, Approved WG 11 document, MPEG Meeting May 6, 2019. (Year: 2019).*
(Continued)

*Primary Examiner* — Kathleen M Walsh
(74) *Attorney, Agent, or Firm* — Essential Patents Group, LLP

(57) ABSTRACT

Techniques related to immersive video coding are discussed and include immersive video sequences and output units forrandom access to the immersive video, coding improve-
(Continued)

ments for camera parameters coding, and coding efficiency improvements for atlas parameters.

10 Claims, 10 Drawing Sheets

(51) Int. Cl.
   *H04N 19/124* (2014.01)
   *H04N 19/159* (2014.01)
(58) Field of Classification Search
   CPC .. H04N 19/124; H04N 19/159; H04N 19/597; H04N 19/70
   USPC ..................................................... 375/240.12
   See application file for complete search history.

(56) References Cited

U.S. PATENT DOCUMENTS

| | | | |
|---|---|---|---|
| 2018/0152688 | A1 | 5/2018 | Graziosi |
| 2018/0234673 | A1 | 8/2018 | Zabatani et al. |
| 2018/0286013 | A1 | 10/2018 | Noh et al. |
| 2018/0302603 | A1 | 10/2018 | Tanaka |
| 2019/0371051 | A1* | 12/2019 | Dore .......................... G06T 7/90 |

OTHER PUBLICATIONS

International Search Report and Written Opinion for PCT Application No. PCT/US2020/032953, mailed Aug. 26, 2020, 10 pages.
Extended European Search Report for European Patent Application No. 20805154.0, dated Feb. 17, 2023.
Invitation pursuant to Rule 62a for European Patent Application No. 20805154.0 dated Dec. 19, 2022.
"Test Model for Immersive Video", ISO/IEC JTC I/SC 29/WG11, Approved WG11 document; MPEG Meeting May 6, 2019.
International Preliminary Report on Patentability for PCT Application No. PCT/US2020/032953, dated Nov. 25, 2021.
Office Action for Indian Patent Application No. 202147041647, dated Feb. 23, 2023.
Office Action from Japanese Patent Application No. 2021-562896 notified May 14, 2024, 7 pgs.
"Continous improvement of Study Text of ISO/IEC CD 23090-5 Video-based Point Cloud Compression," N18479, May 2019, Geneva, CH, 132 pgs.
"Working Draft 1 of Metadata for Immersive Media (Video)," N18464, Apr. 2019, Geneva, CH, 33 pgs.
Notice of Allowance from Japanese Patent Application No. 2021-562896 notified Aug. 26, 2024, 6 pgs.

* cited by examiner

IMMERSIVE VIDEO CODING TECHNIQUES FOR THREE DEGREE OF FREEDOM PLUS/METADATA FOR IMMERSIVE VIDEO (3DoF+/MIV) AND VIDEO-POINT CLOUD CODING (V-PCC)

CLAIM OF PRIORITY

This Application is a National Stage Entry of, and claims priority to, PCT Application No. PCT/US2020/032953, filed on 14 May 2020 and titled "A COMMON SPECIFICATION FOR THREEDEGREE OF FREEDOM PLUS/METADATA FOR IMMERSIVE VIDEO (3DoF+/MIV) AND VIDEO-POINT CLOUD CODING (V-PCC)", which claims priority to U.S. Provisional Patent Application No. 62/847,779, filed 14 May 2019, both of which are incorporated by reference in there entireties for all purposes.

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

Currently, two separate standards specifications are defined by the Moving Pictures Experts Group (MPEG) for the 3DoF+/MIV (3 Degree of Freedom Plus/Metadata for Immersive Video) project and the V-PCC (Video-Point Cloud Coding) project. Implementation of two different standards will require additional design complexity for product integration and will make ecosystem adoption of the standards less likely. Furthermore, the existing standards have areas of high complexity and/or inefficient video compression efficiency. It is with respect to these and other considerations that the present improvements have been needed. Such improvements may become critical as the desire to encode and decode immersive and 3D video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
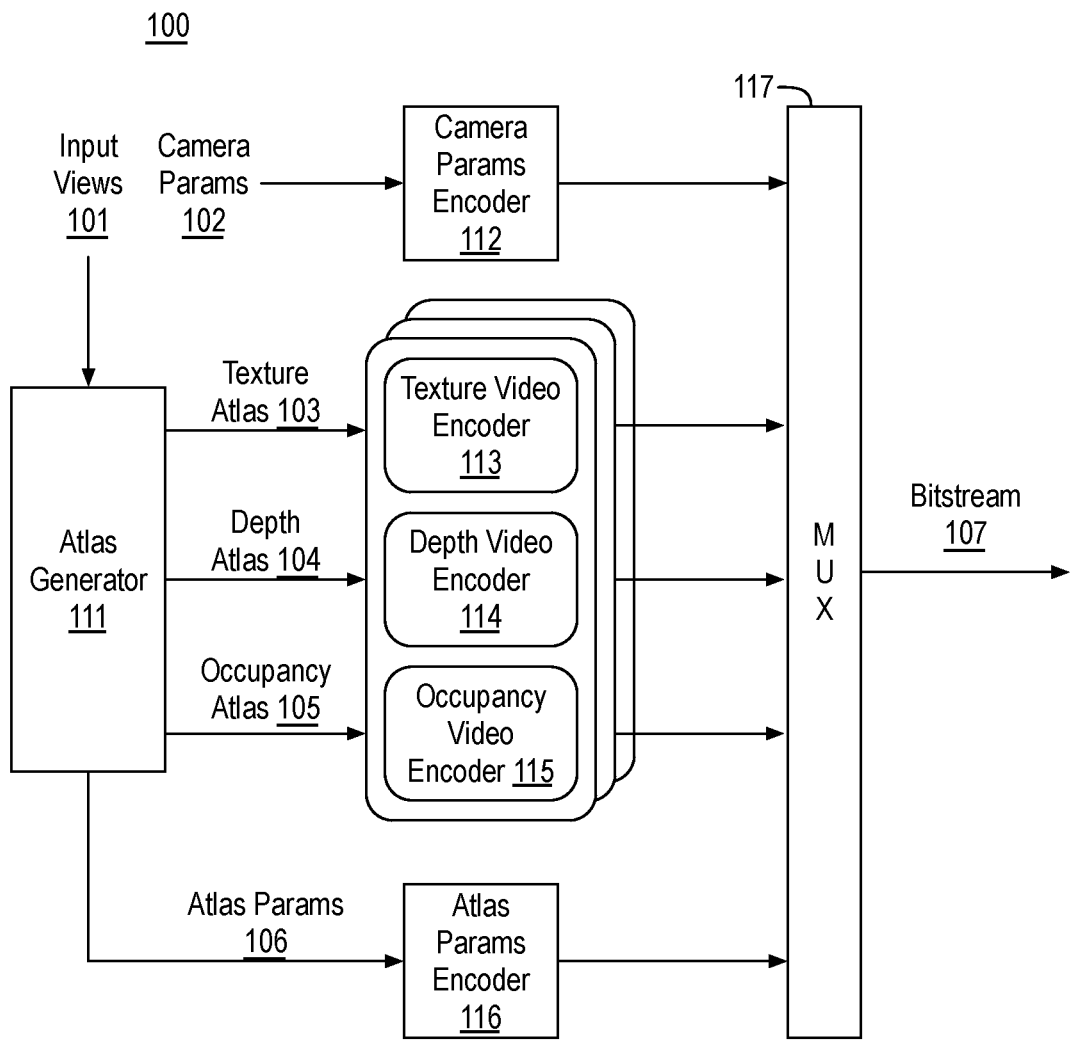
FIG. 1 is an illustrative diagram of an example encoder system for coding input views of immersive video to generate a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to 3 Degree of Freedom Plus/Metadata for Immersive Video and Video-Point Cloud Coding.

The techniques discussed herein provide for a combined immersive video (IV) specification for 3DoF+/MIV and V-PCC. The disclosed techniques include definition of an immersive video sequence and immersive video output unit; allocation of High Efficiency Video Coding (HEVC) ScalabilityId types for atlases, occupancy maps, and additional attributes; allocation of an HEVC Network Abstraction Layer (NAL) Unit Type value, which can be used or not used for carriage of IV units; bit packing of occupancy maps in lossless mode; coding efficiency improvements of camera parameters list and atlas parameters list; point cloud rendering as a decoder conformance requirement; and others.

The disclosed techniques provide a variety of advantages including a single combined specification to reduce implementation complexity instead of having two separate specifications to implement and validate (e.g., such that a combined IV specification may be implemented in discrete graphics components. Furthermore, the combined specification has more clear definitions of conformance, which simplifies interoperability.

The techniques discussed herein provide for MIV and V-PCC to both be supported by a common specification, although with different test models/reference software. The two existing separate specifications, referred to above are MIV WD1 and V-PCC SCD. The common MIV/V-PCC specification discussed herein is referred to herein as for IV, for Immersive Video. The proposed syntax provides modifications to incorporate the full V-PCC feature set. A profile to support the MIV use case is provided, which could also provide basic point cloud coding support. A profile to support to the V-PCC use case enabling exact reconstruction is also provided herein. The MIV requirements state that HEVC will be used. A MIV "Immersive Main 10" profile is provided herein, which is limited to HEVC and requires use of the HEVC Annex F extension to carry texture and atlas depth components and associated occupancy maps. A new HEVC "Independent Layers Main 10" profile is also provided, to define HEVC conformance for a bitstream containing multiple independent layers, which could be applicable for a broad range of use cases, not restricted to IV. V-PCC allows use of different video codecs, and mentions HEVC and AVC. In order to support V-PCC using AVC, a high level syntax extension to AVC is provided, similar to HEVC's Annex F, rather than defining a generic multi-layer design within the IV specification. Versatile Video Coding (VVC), for example, supports a multi-layer design that may be used in a similar manner to the discussed HEVC techniques. A V-PCC "Point Cloud HEVC Main 10" profile is provided herein. The attached draft specification (Draft Specification for Immersive Video (IV)) provides an IV specification. Support has been added for some aspects of V-PCC, but additional modifications will be required to fully support V-PCC functionality.

FIG. 1 is an illustrative diagram of an example encoder system 100 for coding input views 101 of immersive video to generate a bitstream 107, arranged in accordance with at least some implementations of the present disclosure. As shown in FIG. 1, encoder system 100 includes an atlas generator 111, a camera parameters encoder 112, a texture video encoder 113, a depth video encoder 114, an occupancy video encoder 115, an atlas parameters encoder 116, and multiplexer 117.

Encoder system 100 provides video compression and encoder system 100 may be a portion of a video encode system implemented via a computer or computing device such as a computing system or the like. For example, encoder system 100 receives input views 101 and generates bitstream 107, which may be decoded by a decoder to generate a decompressed version at least some of input views 101. Bitstream 107 may be compatible with a video compression-decompression (codec) standard such as, for example, MIV or V-PCC. Encoder system 100 may include other modules or sub-modules not shown for the sake of clarity of presentation. For example, encoder system 100 may include downsamplers, encode controllers, transform modules, quantization modules, intra prediction modules, inter prediction modules, entropy encoders, etc. Such modules are known to those of skill in the art and are not discussed further herein for the sake of clarity of presentation. Encoder system 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

Atlas generator 111 receives input views 101 (multiple views of input video) for encode. For example, any number of views of a scene and the views may include a texture picture or frame (or texture video) and a geometry picture or frame (or geometry video). Notably, for each time instance, video data for one or more views of a scene are provided such that multiple texture frames and multiple depth or geometry frames may be implemented. For example, each texture frame may include per pixel color information such as YUV data, RGB data, or similar data and each geometry or depth frame may include per pixel depth data or similar data. The texture and geometry frames may have the same or differing resolutions. For example, the texture frames may be video graphics array (VGA), high definition (HD), Full-HD (e.g., 1080p), 4K resolution video, 8K resolution video, or the like. Techniques discussed herein are discussed with respect to frames and pictures (which are used interchangeably).

Atlas generator 111 generates a texture atlas 103, a geometry or depth atlas 104, an occupancy atlas 105, and corresponding atlas parameters for one or more time instances of input views 101. For example, each of the multiple views of input views 101 may be broken into patches (e.g., rectangular regions) that are arranged to form an atlas. The formation of the atlas seeks to reduce redundancy among the multiple views. As shown, texture atlas 103 (containing texture information), geometry or depth atlas 104 (containing geometry or depth information), occupancy atlas 105 (containing occupancy information), and atlas parameters 106 are formed and provided to corresponding encoders 113, 114, 115, 116, which encode texture atlas 103, geometry or depth atlas 104, occupancy atlas 105, and atlas parameters 106, which are provided to multiplexer 117 of encoding system 101. Furthermore, camera parameters encoder 112 receives camera parameters 102 and encodes them into a bitstream which is also received by multiplexer 117 for inclusion in bitstream 107. Camera parameters 102 include the extrinsic and intrinsic parameters for each of the cameras corresponding to input views 101 (e.g., cameras used to attain input views 101) and are discussed further herein below.

According to embodiments discussed herein, a variety of terms and parameters are defined. The following provides definitions according to embodiments of the present techniques. The term 3D scene indicates visual content in the global reference coordinate system. The term access unit indicates a set of NAL units that are associated with each other according to a specified classification rule, are consecutive in decoding order and contain at most one coded picture with any specific value of nuh_layer_id. The term atlas indicates aggregation of patches from one or more view representations after a packing process, into a picture group which contains a texture component picture, a corresponding depth component picture, and a corresponding occupancy map picture. The term atlas component indicates a texture, depth, or occupancy map component of an atlas. The term atlas layer group indicates a texture layer, corresponding depth layer, and corresponding occupancy map layer representing an atlas within the bitstream. The term atlas list indicates a list of one or more atlases which may be present within the same iv output unit. The term atlas patch occupancy map indicates a 2D array corresponding to an atlas whose values indicate for each sample position in the atlas which patch the sample corresponds to, or if the sample is invalid. The term atlas sequence indicates a sequence of one or more atlases, containing at most one atlas for each iv output unit. The term camera parameters defines the projection used to generate a view representation from a 3D scene, including intrinsic and extrinsic parameters. The term camera parameters list indicates a list of one or more camera parameters. The term component indicates depth or texture or occupancy map. The term depth layer indicates a layer representing an atlas depth component. The term field of view indicates the extent of the observable world in captured/recorded content or in a physical display device. The term global coordinate axes indicates coordinate axes that are associated with audio, video, and images representing the same acquisition position and intended to be rendered together. The term global reference coordinate system indicates a 3D Cartesian coordinate system using global coordinate axes, in units of meters. The term hypothetical reference renderer indicates a hypothetical renderer model that outputs a viewport. The term hypothetical 3D scene reconstructor indicates a hypothetical 3D scene reconstruction model that outputs a 3D video sequence. The term immersive video sequence (IVS) indicates a sequence of one or more immersive video output units. The term layer indicates a set of VCL NAL units that all have a particular value of nuh_layer_id and the associated non-VCL NAL units, or one of a set of syntactical structures having a hierarchical relationship. The term occupancy map indicates a 2D array indicating occupancy of a sample in a corresponding texture picture. The term omnidirectional media indicates media such as image or video and its associated audio that enable rendering according to the user's viewing orientation, if consumed with a head-mounted device, or according to user's desired viewport, otherwise, as if the user was in the spot where and when the media was captured. The term omnidirectional projection indicates inverse of the process by which the samples of a projected picture are mapped to a set of positions identified by a set of azimuth and elevation coordinates on a unit sphere. Projection example are ERP, cubemap (cubic map) or perspective. The term output unit indicates a set of NAL units that are associated with each other according to a specified classification rule, are consecutive in decoding order, and contain exactly one output representation. The term patch indicates a rectangular region within an atlas that corresponds to a rectangular region within a view representation. The term patch descriptor indicates a description of the patch, containing its size, location within an atlas, rotation within an atlas, and location within a view. The term picture group indicates a texture picture and corresponding depth picture and occupancy map picture from the same access unit. The term point indicates a 3D position in a quantized 3D global reference coordinate system. The term point cloud sequence indicates a sequence of one or more point clouds. The term point cloud indicates a set of 3D points in a quantized 3D global reference coordinate system, and optionally a set of corresponding attributes, at a particular time instance. The term projection indicates inverse of the process by which the sample values of a projected texture component picture of a view representation are mapped to a set of positions in a 3D scene represented in the global reference coordinate system according to the corresponding depth sample value and camera parameters list. The term reference point cloud renderer indicates an embodiment of a process that derives a decoded point cloud sequence from the outputs of the decoding process. The term renderer indicates an embodiment of a process to create a viewport from a 3D scene representation corresponding to a viewing orientation and viewing position. The term source indicates a term used to describe the video material or some of its attributes before encoding. The term source view representation indicates a term used to describe source video material before encoding that corresponds to the format of a view representation, which may have been acquired by capture of a 3D scene by a real camera or by projection by a virtual camera onto a surface using camera parameters, or by projection of a point cloud onto a surface. The term texture layer indicates a layer representing an atlas texture component. The term viewing orientation indicates triple of azimuth, elevation, and tilt angle characterizing the orientation that a user is consuming the audio-visual content; in case of image or video, characterizing the orientation of the viewport. The term viewing position indicates triple of x, y, z characterizing the position in the global reference coordinate system of a user who is consuming the audio-visual content; in case of image or video, characterizing the position of the viewport. The term view representation indicates 2D sample arrays of a texture component and a corresponding depth component representing the projection of a 3D scene onto a surface using camera parameters. The term viewport indicates projection of texture onto a planar surface of a field of view of an omnidirectional or 3D image or video suitable for display and viewing by the user with a particular viewing orientation and viewing position.

Furthermore the following abbreviations are used herein: 2D (Two-Dimensional), CMP (CubeMap Projection), CVS (Coded Video Sequence), ERP (EquiRectangular Projection), FOV (Field Of View), HEVC (High Efficiency Video Coding), HMD (Head-Mounted Display), IRAP (Intra Random Access Point), OMAF (Omnidirectional MediA Format), URN (Uniform Resource Name), and VR (Virtual Reality). Mathematical operators, logical operators, relational operators, bit-wise operators, assignment operators, range notation, mathematical functions, order of operation precedence, variables, syntax elements, and tables, description of logical operations, and processes are used herein in accordance with their common usage in the art.

In some embodiments, bitstream 107 includes IV sequence parameters, including camera parameters list, IV output unit parameters, including atlas parameters list, and a multi-layer video codec bitstream containing one or more atlas layer groups. In some embodiments, the immersive video source that is represented by bitstream 107 is one or more sequences of texture and depth pictures. Each of the texture and depth pictures represents a specific time instance of a view of a 3D scene, and may have been captured by a real camera or generated by a virtual camera, or may have been created by projecting a point cloud onto multiple surfaces. In some embodiments, the outputs are a camera parameters list, and for each of one or more atlases the following: a sequence of decoded picture groups with a texture component, a depth component and an occupancy map component, optional sequence of decoded pictures for additional attributes, a sequence of atlas parameters, and a sequence of atlas patch occupancy maps. In some embodiments, a hypothetical reference renderer can reconstruct a viewport at a specified viewing position and viewing orientation from the outputs. For example, a hypothetical 3D scene reconstructor can reconstruct a 3D video sequence from the outputs. In some embodiments, a specified reference point cloud renderer can reconstruct a point cloud sequence, with optional additional attributes, from the outputs of the decoding process.

Discussion now turns to the high level bitstream structure of bitstream 107. Notably, a fundamental aspect of the combined MIV/V-PCC design discussed herein is an overall structure of the bitstream. Some high-level background on the two separate specifications is provided, and then discussion turns to the IV high level bitstream structure of the present disclosure.

The MIV WD [N18464] defines the use of one or more atlases, each with a texture and depth component. The atlas texture component and atlas depth component are each coded using HEVC, with each component carried in a separate layer in a multi-layer bitstream. An atlas contains one or more patches, where each patch is a rectangular region with a corresponding position from a particular view representation. In the MIV WD1, it is required that the coded picture order be the same for all layers, e.g. for each component of the atlas. This means that each access unit in the multi-layer bitstream contains both a texture coded picture and a depth coded picture. The camera parameters list syntax structure signals a list of one or more cameras, and for each camera signals extrinsic and intrinsic parameters. The camera parameters list is signaled for each Intra Random Access Picture (TRAP). The signaled parameters include the position and orientation used to generate each view representation, from projection of the 3D video scene onto a surface. The video projection surface may be a plane (for perspective projection) or a sphere (for omnidirectional projection). Atlas parameters may be signaled for each IRAP picture, or may be signaled per picture. No inter-frame prediction of atlas parameters is performed. In the test MIV software, atlas parameters are signaled for each TRAP, not for each picture, and the values persist through the coded video sequence until a new IRAP occurs. An atlas parameter list syntax structure signals a list of one or more atlases. For each atlas, a list of patches are described, with each patch description including the following information: (width, height) of the patch; (x, y) position of the patch in the atlas; (x, y) position of the patch in the view; rotation of the patch, in the atlas relative to the view. Occupancy map data is embedded within the depth, by using values below a threshold to indicate an occupied sample position. The coded picture size of the depth is required to be equal to the coded picture size of the corresponding texture. The outputs of the decoding process include one or more decoded picture sequence groups representing an atlas, each group containing a texture picture sequence representing an atlas texture component and a depth picture sequence representing an atlas depth component, one or more atlas patch occupancy map sequences, and .atlas patch parameters. An atlas patch occupancy map is a 2D array, the same size as the texture and depth picture, containing the patch id as the value for each sample position. A hypothetical viewport renderer is mentioned as being able to use those outputs, but is not described or specified.

In V-PCC, a concept similar to atlases is used, but the atlas terminology is not used. Depth is referred to as geometry. A point cloud sequence is represented by texture and geometry (depth) projections onto planes, forming texture and geometry videos. Either 6 projection planes representing a bounding rectangular solid, or 8 projection planes are used. The projection planes surround the point cloud, from the outside looking in. Patch data can be signaled per picture, and may use inter-frame prediction. Occupancy map data is coded as video pictures, and may be use lossy or lossless video coding. Additional attributes of a point cloud such as normal and reflectance may be coded as video pictures, also using projection onto planar surfaces. There is no requirement that texture, depth, occupancy map, and additional attribute pictures follow the same coded picture order. The V-PCC SCD does not clearly describe any alignment between these separate video codec bitstreams, but presumably some type of alignment will need to be defined, in order to enable random access. Output of the decoding process is a set of decoded video streams, corresponding to the texture, geometry, occupancy map, and any attributes, as well as information about the point cloud sequence, and the decoded patch data information. These outputs can be used to perform the 3D point cloud reconstruction process, which is specified, but not always required for conformance.

The following provides the high level bitstream structure of bitstream 107, according to some embodiments. In some embodiments, bitstream 107 contains a sequence of one or more IVSes. Each IVS contains a sequence of output units. Each IVS contains one or more atlas layer groups, each atlas layer group having a texture layer, a depth layer, and an occupancy map layer. Each layer contains one or more consecutive CVSes in a unique independent video codec layer, with each CVS containing a sequence of coded pictures. An IVS begins with a CVS for each layer. Each atlas layer group represents a sequence of atlases. An atlas is represented by a decoded picture group in each output unit, with a texture component picture, a depth component picture, and an occupancy map picture. The size of an atlas is equal to the size of the decoded picture of the texture layer representing the atlas. In some embodiments, the depth decoded picture size is equal to the decoded picture size of the corresponding texture layer of the same atlas layer group. Occupancy maps represent the same size, but the actual coded occupancy map picture size may differ because of scaling and/or packing. Decoded picture sizes may vary for different atlases represented in the same bitstream.

Figure 2:
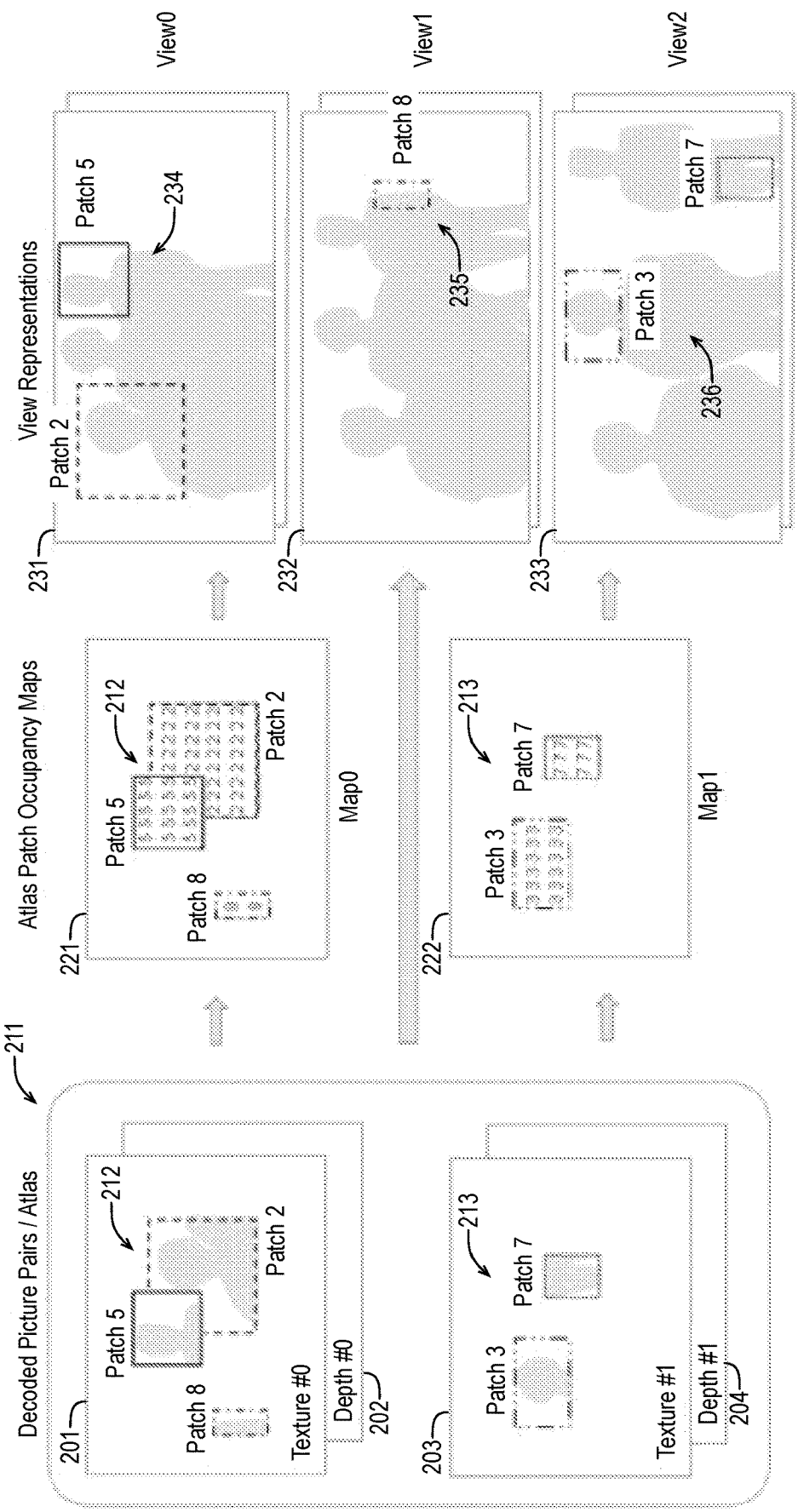
FIG. 2 illustrates example texture atlases, depth atlases, occupancy map atlases, and reconstructed view representations.

FIG. 2 illustrates example texture atlases, depth atlases, occupancy map atlases, and reconstructed view representations, arranged in accordance with at least some implementations of the present disclosure. As shown in FIG. 2, atlases are generated, encoded, and decoded using the techniques discussed herein. FIG. 2 illustrates decoded atlas picture pairs 211 including a texture atlas 201 and a depth atlas 202 and a texture atlas 203 and a depth atlas 204, corresponding occupancy map atlases (not shown), and corresponding atlas patch occupancy maps 221, 222. For example, the occupancy map atlases include occupancy information for each of the patches of the texture and depth atlases such that the occupancy value for a pixel or block is indicative of the importance of each such pixel or block while atlas patch occupancy maps 221, 222 indicate the patch to which each pixel or block belongs within the texture, depth, and occupancy atlases. Notably, the texture, depth, and occupancy atlases are encoded as pictures (e.g., using HEVC or the like) while the atlas patch occupancy maps 221, 222 are coded and reconstructed based on information about each patch (location, size, priority of patches).

As discussed herein, texture atlases 201, 203, depth atlases 202, 204, and occupancy map atlases 221, 222 are reconstructed from corresponding texture atlases, depth atlases, and occupancy map atlases, which are encoded into bitstream 107. In the illustrated example, texture atlas 201, depth atlas 202, and occupancy map atlas 221 include exemplary patches 212 (patches 2, 5, 8) and texture atlas 203, depth atlas 204, and occupancy map atlas 222 include exemplary patches 213 (patches 3 and 7). Such patches are matched to views using atlas patch occupancy maps 221, 222 (or atlas block to patch maps) as illustrated to provide the decoded patches 2, 3, 5, 7, 8 within relevant selected views 231, 232, 233 of reconstructed texture and depth (e.g., View0, View1, View2) such that, in the illustrated example, patch 234 (patch 5) is in view 231, patch 235 (patch 8) is in view 232, and patches 236 (patches 3, 7) are in view 233. Thereby, at least portions of the selected views are reconstructed at a decoder system 300 for use in viewport generation and other operations.

As discussed, a patch is a rectangular region that is represented in both an atlas and a view representation. In some embodiments, the size of a particular patch is the same in both the atlas representation and the view representation. An atlas contains an aggregation of one or more patches from one or more view representations, with a corresponding texture component, depth component, and occupancy map component. The atlas patch occupancy map generator process outputs an atlas patch occupancy map. The atlas patch occupancy map is a 2D array of the same size as the atlas, with each value indicating the index of the patch to which the co-located sample in the atlas corresponds, if any, or otherwise indicates that the sample location has an invalid value. A view representation represents a field of view of a 3D scene for particular camera parameters, for the texture and depth component. View representations may be omnidirectional or perspective, and may use different projection formats, such as equirectangular projection or cube map projection as defined in OMAF. In some embodiments, the texture and depth components of a view representation use the same projection format and have the same size. FIG. 2 provides an illustrative example, in which two atlases contain 5 patches, which are mapped to 3 view representations.

Figure 3:
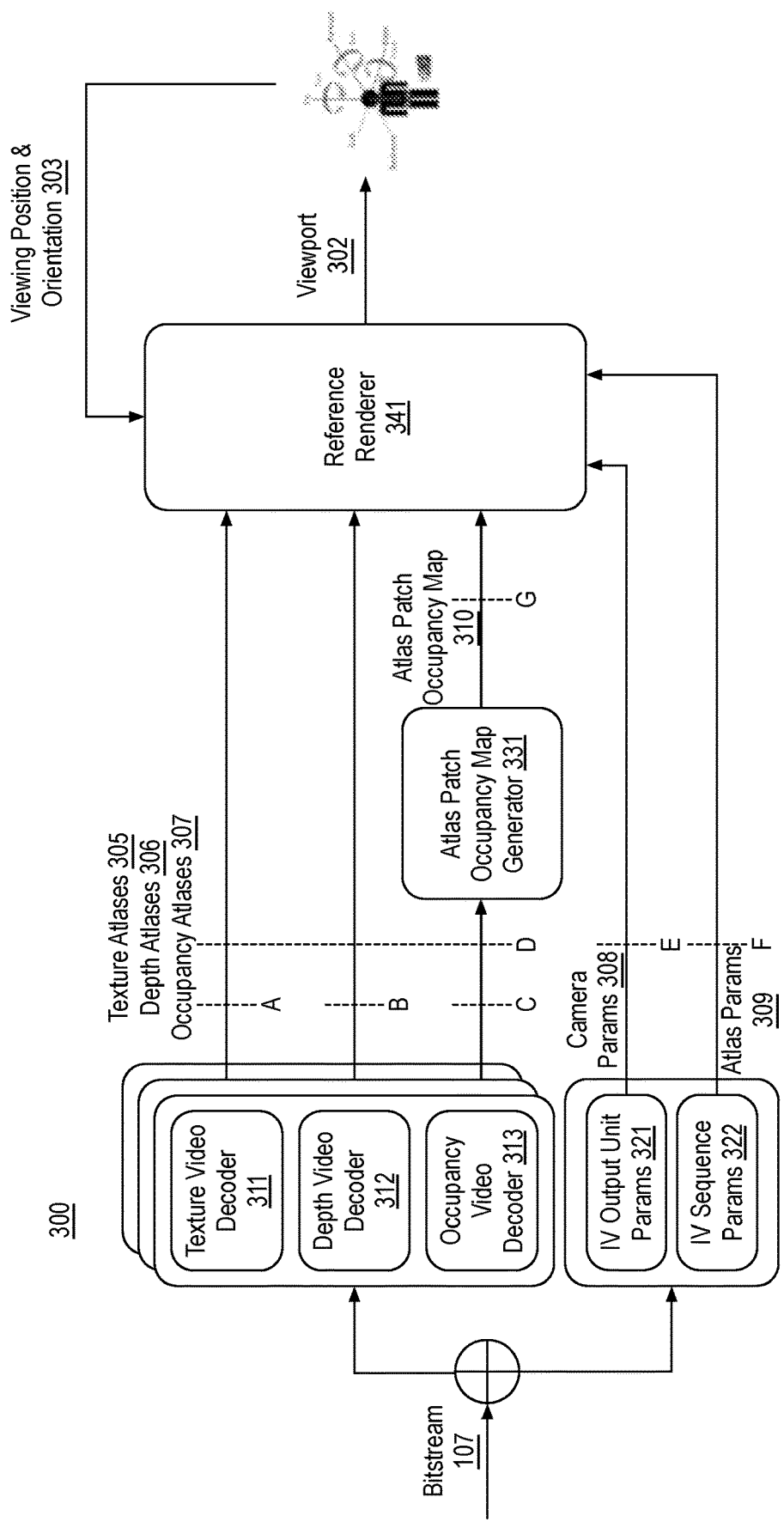
FIG. 3 is an illustrative diagram of an example decoder system for decoding a bitstream to generate a viewport corresponding to immersive video.

FIG. 3 is an illustrative diagram of an example decoder system 300 for decoding bitstream 107 to generate a viewport 302 corresponding to immersive video, arranged in accordance with at least some implementations of the present disclosure. As shown in FIG. 3, decoder system 300 includes a texture video decoder 311, a depth video decoder 312, an occupancy video decoder 313, an IV output unit parameters decoder 321, an IV output unit parameters decoder 322, an atlas patch occupancy map generator 331, and a reference renderer 341. Decoder system 300 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

As shown, bitstream 107 is received by decoder system 300. In some embodiments, bitstream 107 is an IVS bitstream containing a CVS for each texture, depth, and occupancy map layer component of an atlas layer group. Decoder system 300 outputs a sequence of decoded texture atlases 305 (reconstructed versions of texture atlases 103), decoded depth atlases 306 (reconstructed versions of depth atlases 104), decoded occupancy atlases 307 (reconstructed versions of occupancy atlases 105). For example, decoder system 300 outputs decoded picture groups of synchronized decoded texture pictures (A), decoded depth pictures (B). Each decoded picture group represents an atlas (D). Furthermore, metadata is input to IV output unit parameters decoder 321 and IV output unit parameters decoder 321 (e.g., collectively, a metadata parser), which output camera parameters 308 (e.g., a reconstructed version camera parameters 102) of and atlas parameters 309 (e.g., a reconstructed version camera parameters 106). For example, IV output unit parameters decoder 321 and IV output unit parameters decoder 321 generate an atlas parameters list (E) and a camera parameters list (F).

Furthermore, atlas patch occupancy map generator 331 receives as inputs the depth decoded picture (B) (decoded depth atlases 306) and the atlas parameters list (D) (atlas parameters 309) and outputs an atlas patch occupancy map 310 (G). In some embodiments, reference renderer 341 receives as inputs one or more decoded atlases (C) (occupancy atlases 307), the atlas parameters list (D), the camera parameters list (E) (camera parameters 308), the atlas patch occupancy map sequence (F) (atlas parameters 309), and a viewer position and orientation 303 (e.g., as received from a display device), and outputs a viewport 302 (representative of a view from any virtual camera within a scene). In some embodiments, decoder system 300 does not include reference renderer 341. In some embodiments, the discussed outputs of decoder system 300 are provided to a reference point cloud renderer, which generates a point cloud sequence for each output unit.

Discussion now turns to syntax and semantics. In the following, syntax tables specify a superset of the syntax of allowed bitstreams. In some embodiments, additional constraints on the syntax may be specified. The following tables list exemplary syntax. In some embodiments, when a syntax_element appears, it specifies that a syntax element is parsed from the bitstream and the bitstream pointer is advanced to the next position beyond the syntax element in the bitstream parsing process. The term byte_aligned( ) is specified as follows: if the current position in the bitstream is on a byte boundary (i.e. the next bit in the bitstream is the first bit in a byte) the return value of byte_aligned( ) is equal to TRUE; otherwise, the return value of byte_aligned( ) is equal to FALSE. The term b(8) indicates byte having any pattern of bit string (8 bits); the parsing process for this descriptor is specified by the return value of the function read_bits(8). The term f(n) indicates a fixed-pattern bit string using n bits written (from left to right) with the left bit first; the parsing process for this descriptor is specified by the return value of the function read_bits(n). The term se(v) indicates a signed integer 0-th order Exp-Golomb-coded syntax element with the left bit first. The term i(n) indicates a signed integer using n bits; when n is "v" in the syntax table, the number of bits varies in a manner dependent on the value of other syntax elements; the parsing process for this descriptor is specified by the return value of the function read_bits(n) interpreted as a two's complement integer representation with most significant bit written first. The term u(n) indicates unsigned integer using n bits; when n is "v" in the syntax table, the number of bits varies in a manner dependent on the value of other syntax elements; the parsing process for this descriptor is specified by the return value of the function read_bits(n) interpreted as a binary representation of an unsigned integer with most significant bit written first. The term ue(v) indicates an unsigned integer 0-th order Exp-Golomb-coded syntax element with the left bit first.

With further reference to bitstream 107, in some embodiments, access units which contain an IRAP picture in any layer, shall contain an IRAP picture in all layers containing a coded picture. For example, in the combined IV specification according to some embodiments, IRAP alignment is required for all of the video codec layers representing the components of the atlas. An IV sequence (IVS) begins with an IRAP in all video codec layers. In some embodiments, an IVS_unit_rbsp( ) syntax structure is defined, to carry data not included within a video codec layer. An IVS begins with an ivs_params( ) syntax structure, which carries syntax elements signaled per IVS, including the camera parameters list.

The decoding process specifies outputs for each IVS, which include camera parameters. In some embodiments, an IV output unit is defined that allows different video codec layers to have different picture coding orders, apart from the requirement to having IRAP alignment across video codec layers. Notably, in HEVC, access units are aligned with picture coding order, which is not required for IV. In some embodiments, an IV output unit includes: an IV NAL unit of type output unit parameters, an output unit parameter syntax structure, zero or one atlas parameters list, which describes one or more atlases, for each atlas: zero or one texture coded picture, zero or one occupancy map coded picture, zero or one depth coded picture, and zero or one coded picture for each of several additional attributes, and a zero or one output unit delimiter. As discussed, in some embodiments, a conforming bitstream includes one or more IVSes and each IVS includes one or more IV output units. In some embodiments, each IVS includes an IV NAL unit of type sequence parameters, one or more IRAP-aligned multi-layer video codec CVSs, and one or more IV NAL units of type output unit parameters.

In some embodiments, an IRAP-aligned multi-layer video codec CVS includes one or more layer groups, each layer group representing an atlas containing three or more video codec CVSs, with each CVS representing a separate component of the atlas each contained within a distinct layer. In some embodiments, the IRAP-aligned multi-layer video codec CVS includes one or more video codec access units, each video codec access unit containing one or more coded pictures, and when an IRAP picture is present in an access unit for any layer in the layer group, an IRAP picture is present in all layers in the layer group in that access unit.

In some embodiments, the decoding process specifies outputs for each output unit, which contain all necessary data to input to processes to generate a viewport or render a point cloud. In some embodiments, the decoding process specifies the following outputs for each output unit: for each of one or more atlases: a texture decoded picture representing an atlas texture component, a depth decoded picture representing an atlas depth component, an occupancy map decoded picture representing an occupancy map component, optionally, one or more decoded pictures, each representing an additional attribute, an atlas patch occupancy map, and atlas (patch) parameters list. As used herein, the term atlas patch occupancy map indicates, as discussed, a 2D array corresponding to an atlas whose values indicate for each sample position in the atlas which patch the sample corresponds to, or if the sample is invalid, and the terms atlas patch occupancy map and BlockToPatchMap may be used substantially interchangeably.

For MIV, an output unit is aligned with a video codec access unit, so the video decoded pictures of all layers are aligned with the video codec output order. In some embodiments, this restriction is imposed in the Immersive Main 10 profile, as described herein below. For V-PCC, the coding order may differ for the different components of an atlas, so the IV decoding process is responsible for outputting the corresponding pictures representing all the components of all atlases at the output time for each output unit.

Figure 4:
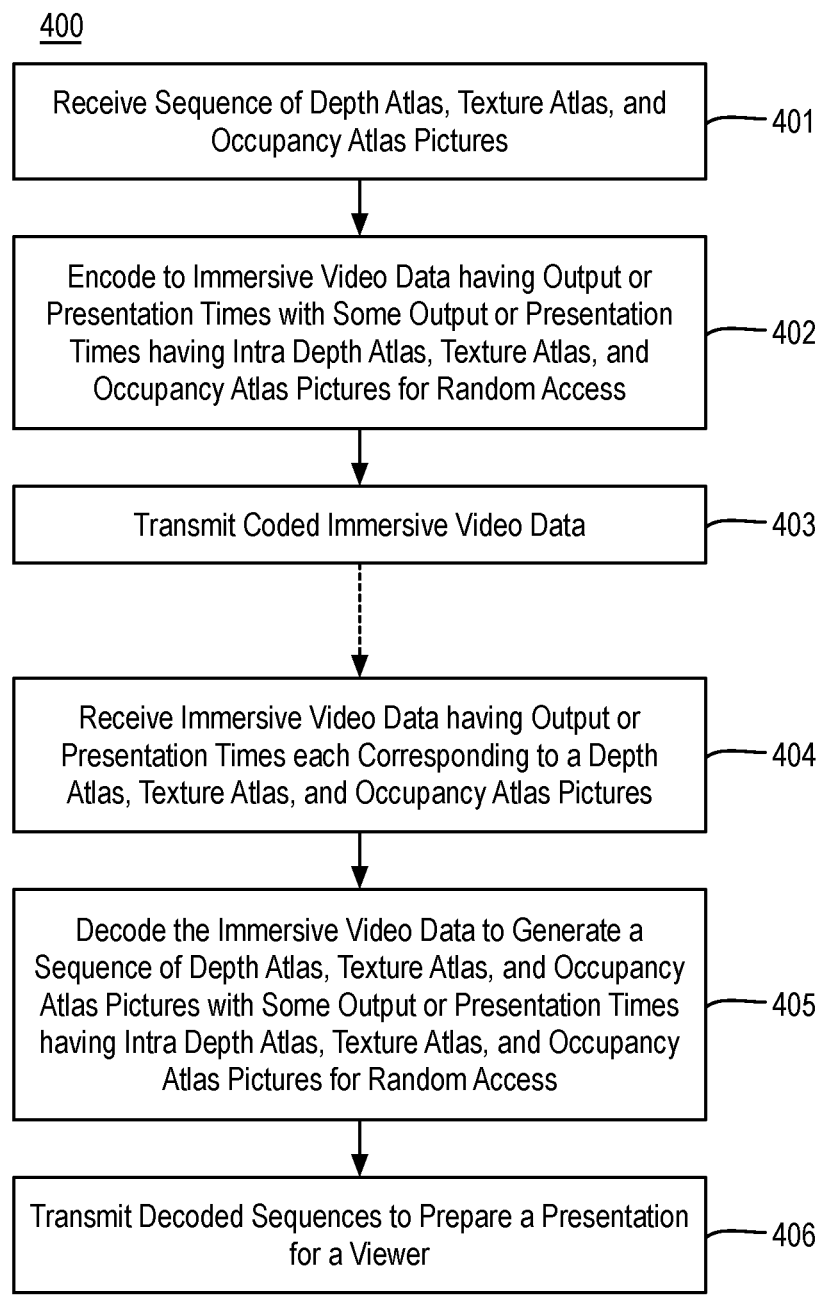
FIG. 4 is a flow diagram illustrating an example process for immersive video coding including intra random access points.

FIG. 4 is a flow diagram illustrating an example process 400 for immersive video coding including intra random access points, arranged in accordance with at least some implementations of the present disclosure. Process 400 may include one or more operations 401-406 as illustrated in FIG. 4. Process 400 may be performed by any device of system discussed herein.

Processing begins at operation 401, where a sequence of depth atlas pictures, a corresponding sequence of texture atlas pictures, and a corresponding sequence of occupancy map atlas pictures representative of immersive video are received for processing. For example, the depth atlas pictures, the texture atlas pictures, and the occupancy map atlas pictures may be generated based on input views of video attained from a number cameras trained on a scene. The atlas pictures (e.g., patches arranged into picture atlases) are received for encode view encoding system 100 for example. In some embodiments, operations 401-403 are performed by an encoder and operations 404-406 are performed by a decoder. The depth atlas pictures, the texture atlas pictures, and the occupancy map atlas pictures may be sequences of texture atlas 103, depth atlas 104, occupancy atlas 105 for example.

The sequence have corresponding output times or presentation times that indicate at what temporal point in the immersive video the views are to be shown, are relevant to, etc. Such output times or presentation times may be indicated using any suitable data structures such as time stamps and/or they may be derived based on start times, frame rates, etc. As used herein, the terms output times or presentation times are used substantially interchangeably and indicate a temporal point that a group of texture, depth, and occupancy atlases correspond to or are relevant to.

Processing continues at operation 402, where the sequence of depth atlas pictures, the sequence of texture atlas pictures, and the sequence of occupancy map atlas pictures are encoded to provide coded immersive video data. Such atlas pictures may be coded using any suitable technique or techniques such as HEVC compliant encoders or the like. Notably, the coded immersive video data includes or corresponds to output times each corresponding to individual ones of the pictures of the sequence of depth atlas pictures, the sequence of texture atlas pictures, and the sequence of occupancy map atlas pictures. That is, the coded immersive video data (e.g., a bitstream) is representative of such atlas pictures with each having a corresponding output time that is relevant to when the pictures are to presented to a user. In some embodiments, for each of a subset of the output times, the coded immersive video data includes a representation of an intra coded picture for each of a coded depth atlas picture, a corresponding coded texture atlas picture, and a corresponding coded occupancy map atlas picture. Notably, the bitstream may be required to be compliant, to include, for particular output times, an intra coded picture for each of a coded depth atlas picture, a corresponding coded texture atlas picture, and a corresponding coded occupancy map atlas picture such that an intra random access point into the immersive video data is required.

The subset of output times or presentation times may be any suitable subset such as times at particular intervals (e.g., every one second, every two seconds, every 5 seconds, etc.) or at a particular frame rate (e.g., every 60th frame, every 120th frame, etc.). In some embodiments, the subset of output times provide random access points to access the immersive video provided at regular intervals within the output times. In some embodiments, each of the subset of the output times corresponds to an output unit comprising the intra coded depth atlas picture, intra coded texture atlas picture, and intra coded occupancy map atlas picture.

As discussed, in some embodiments, at of such subset of output or presentation times, an intra coded picture for each of a coded depth atlas picture, a corresponding coded texture atlas picture, and a corresponding coded occupancy map atlas picture are required. In some embodiments, the coded immersive video data further comprises an intra coded additional attributes atlas picture corresponding to the intra coded depth atlas picture, intra coded texture atlas picture, and intra coded occupancy map atlas picture. For example, the additional attributes atlas picture may include data corresponding to other attributes of the view including surface normal vectors, reflectance of 3D content, etc. As discussed herein, in some embodiments, the coded immersive video data further comprises an atlas parameter list corresponding to the intra coded depth atlas picture, intra coded texture atlas picture, and intra coded occupancy map atlas picture.

Processing continues at operation 403, where the coded immersive data is transmitted to another device such as a decoder or a memory storage device. For example, the coded immersive data may be included into a bitstream and/or packetized and provided, in the compressed representation, to a decoder or a memory storage device (for eventual use by a decoder).

Processing continues at operation 404, where the coded immersive data is received. For example, the coded immersive data may be received by decoder system 300. As shown, the coded immersive data includes or has corresponding thereto output times or presentation times each corresponding to individual ones of pictures of a sequence of depth atlas pictures, a sequence of texture atlas pictures, and a sequence of occupancy map atlas pictures representative of immersive video. For example, the output times or presentation times may each correspond to particular frames or pictures of the sequences of immersive video.

Processing continues at operation 405, where the coded immersive data is decoded to generate the sequence of depth atlas pictures, the sequence of texture atlas pictures, and the sequence of occupancy map atlas pictures represented by the coded immersive data (e.g., bitstream). For example, the sequence of depth atlas pictures, the sequence of texture atlas pictures, and the sequence of occupancy map atlas pictures are reconstructed versions of the sequence of depth atlas pictures, the sequence of texture atlas pictures, and the sequence of occupancy map atlas pictures coded as discussed with respect to operations 401-403. In some embodiments, for each of a subset of the output times, the decoded sequences include an intra coded picture for each of a coded depth atlas picture, a corresponding coded texture atlas picture, and a corresponding coded occupancy map atlas picture. For example, for a subset of the output or presentation times, each is required or mandated to have an intra atlas picture such that random access to the immersive video is provided.

In some embodiments, the subset of output times include random access points to access the immersive video provided at regular intervals within the output times. As discussed above, the subset may be required at regular intervals of time or frames or the like. In some embodiments, each of the subset of the output times corresponds to an output unit comprising the intra coded depth atlas picture, intra coded texture atlas picture, and intra coded occupancy map atlas picture. In some embodiments, the coded immersive video data further includes an intra coded additional attributes picture corresponding to the intra coded depth atlas picture, intra coded texture atlas picture, and intra coded occupancy map atlas picture. Such an intra coded additional attributes picture may have any suitable attributes relevant to immersive video such as surface normal vectors, reflectance, etc. In some embodiments, the coded immersive video data further includes an atlas parameter list corresponding to the intra coded depth atlas picture, intra coded texture atlas picture, and intra coded occupancy map atlas picture such that patches in the intra coded depth atlas picture, intra coded texture atlas picture, and intra coded occupancy map atlas picture may be allocated to relevant views of the immersive video as discussed herein.

Processing continues at operation 406, where the decoded sequences for use in preparing a presentation for a viewer. For example, the decoded sequences may be used to reconstruct at least portions of views of immersive video and such reconstructed views may be used (based on a user and/or display position and orientation in 3D space) to generate a viewport.

Discussion now turns to occupancy map signaling including the encoding and decoding of atlas parameters 106 and/or data used to indicate the location and particular view to which a patch of an atlas corresponds to. Notably, while both V-PCC and MIV use occupancy map signaling, different methods are used. The techniques discussed herein allow for a lower sample rate for the occupancy map coding for improved efficiency with respect to prior V-PCC and MIV techniques. In MIV WD1, the occupancy map, which for each sample indicates whether or not the sample contains valid patch data, is embedded within the depth component. Values of depth lower than DepthOccupancyMapThreshold (currently equal to 64) indicate an unoccupied sample position. Furthermore, in MIV WD1, a method is described to generate an atlas patch occupancy map. An atlas patch occupancy map is a 2D array for each atlas, in which each sample contains a 16-bit value which indicates the PatchId of the sample. If the sample does not represent a valid patch sample, the atlas patch occupancy map is assigned the value 0xFFFF. In the MIV WD1, the coded picture size of the depth is required to be equal to the coded picture size of the corresponding texture. In V-PCC, the occupancy map is coded as video. Lossy coding can be used, with a threshold value explicitly signaled, to derive a 0 or 1 value from an 8 (or 10-bit or higher) value. Lossless coding can also be used. Feathering can be applied to the occupancy map picture prior to encoding. The occupancy map coded picture may be of a lower resolution than the corresponding texture or depth picture, but the upscaling method is not explicitly specified.

The following provides for occupancy map signaling according to some embodiments. In some embodiments, the MIV occupancy map is explicitly signaled using video encoding. In the MIV WD1 design, it is not permitted to apply padding to the unoccupied depth samples prior to video encoding, because values less than the DepthOccupancyMapThreshold must be maintained. Explicitly coding the depth occupancy map in accordance with techniques discussed herein allows padding of the unoccupied samples to be used on the depth picture. Padding can improve subjective and objective quality of coding.

In some embodiments, scaling may be applied to the occupancy map. In some embodiments, a method of scaling uses sample replication for the generation of the atlas patch occupancy map. Use of sample replication does not cause any loss when occupancy of patches is block aligned with the scaling factor.

In some embodiments, only binary values of 0 or 1 are used to code the occupancy map with lossless coding. In order to reduce the pixel rate used for occupancy map coding by 8x without loss of occupancy map accuracy, 8 occupancy map binary samples are packed into a luma sample byte, using 8 horizontal spatial neighbors.

Bit packing of the occupancy map may be optional, as some video encoders do not support use of a transquant bypass tool. In some embodiments, bit packing of the occupancy map is used in common test conditions. For example, the common test conditions may use HEVC, such that the transquant bypass tool may be used.

In some embodiments, syntax elements are included in an IVS parameters syntax structure related to the occupancy map coding: occupancy_map_threshold, occupancy_map_scaling, and occupancy_map_packing_flag.

In some embodiments, in an Immersive Main 10 profile, the picture size of the occupancy map is restricted to be equal to the coded pictures size of the corresponding texture and depth components, after adjusting for scaling and packing, if any.

Discussion now turns to IV network abstraction layer (NAL) type value and NAL unit data according to some embodiments. For the MIV Immersive Main 10 profile according to some embodiments, the HEVC Video Parameter Set (VPS) extension describes how atlas components are assigned to HEVC layers. In some embodiments, the atlas component sample values are represented in the coded pictures in the HEVC layers.

In some embodiments, an HEVC NAL unit type (NUT) value is allocated for IV to signal additional information not contained within the HEVC VPS extension or HEVC coded pictures. In some embodiments, the allocation of an "IV unit" NUT value is included as a requirement for a conforming bitstream. The contents of NAL unit syntax structures using that NUT value are described further herein.

In some embodiments, IV data in the IV NAL units is contained within an HEVC NAL unit, although the HEVC decoder may ignore NAL units of this type. The systems layer may select to either include the IV data within an HEVC bitstream in this manner or, alternatively, to carry the IV data separately, without using HEVC NAL units for the IV NAL units.

When an IV NAL unit is embedded in an HEVC NAL unit, each IV NAL unit may start with an HEVC nal_unit_header( ).

The IV unit syntax according to some embodiments is shown in the following Table 1, which starts with an ivs_unit_type syntax element, and then contains a syntax structure based on the ivs_unit_type value.

TABLE 1

|  | Descriptor |
| --- | --- |
| ivs_unit( ) { | |
|   ivs_unit_type | u(5) |
|   if ( ivs_unit_type = = 0 ) | |
|     ivs_sequence_params( ) | |
|   else if ( ivs_unit_type = = 1 ) | |
|     iv_output_unit_params( ) | |
|   else if ( ivs_unit_type = = 2 ) | |
|     iv_output_unit_delimiter( ) | |
|   rbsp_trailing_bits( ) | |
| } | |

In Table 1 the following syntax is used. The element ivs_unit indicatse an IVS unit; the element ivs_unit_type indicates the IVS unit type, which are provided in Table 2 below. That is, values of ivs_unit_type according to some embodiments are listed in Table 2 below. In some embodiments, additional values may be added, for example, for V-PCC. In some embodiments, ivs_unit_type specifies the type of IV unit as shown in Table 2.

TABLE 2

| Unit Types | | |
| --- | --- | --- |
| ivs_unit_type | Identifier | Syntax structure |
| 0 | IVS_SP | ivs_params( ) |
| 1 | IVS_OUP | iv_output_unit_params( ) |
| 2 | IVS_OUD | iv_output_unit_delimiter( ) |
| 3 . . . 31 | IVS_RSVD | Reserved |

Herein, some of the syntax elements are defined, according to some embodiments, as follows. The syntax element ivs_all_codec_layers_au_aligned_flag equal to 1 indicates that for each active layer in the multi-layer CVS, each access unit shall contain one picture with nuh_layer_id equal to the active layer id. The syntax element occupancy_map_threshold specifies the threshold below which the value of the occupancy map decoded sample is compare to determine if the sample position is occupied. The syntax element occupancy_map_scaling equal to 0 indicates that the width and height of an occupancy map coded picture are equal to the width and height, respectively, of its corresponding texture coded map picture. occupancy_map_scaling greater than 0 indicates that the width and height of an occupancy map coded picture are equal to the width<<occupancy_map_scaling and height<<occupancy_map_scaling, respectively, of its corresponding texture coded map picture, prior to consideration of occupancy map packing. The syntax element occupancy_map_packing_flag equal to 0 indicates that bit-packing is not applied to the occupancy map decoded picture. occupancy_map_packing_flag equal to 0 indicates that bit-packing is to applied to the occupancy map decoded picture, as described in the atlast patch occupancy map generator process. The syntax element iv_output_unit_count_bits_minus4 plus 4 specifies the number of bits used to represent the iv_output_unit_count syntax element. When not present, the value of iv_output_unit_count_bits_minus4 is inferred to be equal to 0. The syntax element ivs_points_info_present_flag equalt to 1 indicates that the points_info( ) syntax structure is present. ivs_points_info_present_flag equalt to 0 indicates that the points_info( ) syntax structure is not present. The syntax element ivs_sp_vui_present_flag equal to 1 indicates that IV SPS VUI paramaters are present. ivs_sp_vui_present_flag equal to 0 indicates that IV SPS VUI paramaters are not present. The syntax element ivs_volume_range_present_flag equal to 1 indicates that the ivs_bounding_rectangular_solid_flag syntax element is present. ivs_volume_range_present_flag equal to 0 indicates that the ivs_bounding_rectangular_solid_flag syntax element is not present. The syntax element ivs_bounding_rectangular_solid_flag equal to 1 indicates that the 3D volume range represented by the bitstream can be represented by a rectangular solid, with dimensions derived from the camera parameters list. The syntax element ivs_sp_avg_frame_rate_present_flag equal to 1 indicates that the ivs_sp_avg_frame_rate syntax element is present. ivs_sp_avg_frame_rate_present_flag equal to 0 indicates that the ivs_sp_avg_frame_rate syntax element is not present. The syntax element ivs_sp_extension_present_flag equal to equal to 0 specifies that no ivs_sp_extension_data_flag syntax elements are present in the syntax structure. ivs_sp_extension_present_flag equal to 1 specifies that there are ivs_sp_extension_data_flag syntax elements present syntax structure. Decoders may ignore all data that follow the value 1 for ivs_sp_extension_present_flag. The syntax element ivs_sp_extension_data_flag may have any value. Its presence and value do not affect decoder conformance. Decoders conforming to a profile may ignore all ivs_sp_extension_data_flag syntax elements.

Furthermore, IV profile, tier, and level semantics may be provided as follows. The syntax element ivs_tier_flag specifies the tier context for the interpretation of ivs_level_idc. The syntax element ivs_profile_idc indicates a profile to which the IVS conforms. Bitstreams shall not contain values of ivs_profile_idc other than those specified. Other values of ivs_profile_idc are reserved for future use by ISO/IEC. The syntax element ivs_level_idc indicates a level to which the IVS conforms. Bitstreams shall not contain values of ivs_level_idc other than those specified. Other values of ivs_level_idc are reserved for future use by ISO/IEC. The syntax element ivs_max_codec_layers_minus1 specifies the maximum value of the number of layers present in the multi-layer video codec IVS. The syntax element ivs_layer_max_level_idc specifies the maximum value of level indicator for each video codec layer. The syntax element ivs_points_rendering_idc equal to 0 does not indicate whether or not point cloud rendering is recommended to be applied to the outputs of the decoding process on the bitstream. ivs_rendering_type_idc equal to 1 indicates that a point cloud rendering process is recommended to be applied to the outputs of the decoding process. ivs_rendering_type_idc equal to 2 indicates that a point cloud rendering process is recommended to be applied to the outputs of the decoding process, and that the bitstream enables a point cloud rendering process to generate an exact matching point cloud sequence to the point cloud sequence generated by the reference point cloud renderer. Value of ivs_points_rendering_idc in the range of 3 through 15 are reserved for future use by ISO/IEC. When ivs_rendering_idc equal to 2, ivs_oup_num_points_present_flag shall be equal to 1. The syntax element ivs_points_level_idc indicates indicates a point cloud rendering level to which the IVS conforms. The syntax element ivs_ptl_reserved_8bits may have any value. The syntax element ivs_ptl_reserved_4bits may have any value.

Discussion now turns to IV sequence and output unit parameters according to some embodiments. In some embodiments, the IV high layer syntax are separated into IV sequence parameters and IV output unit parameters syntax structures, with the IV sequence parameters signaled for each IVS, and the IV output unit parameters signaled for each IV output unit.

In some embodiments, IVS parameters are signaled for each IV sequence (IVS). In some embodiments, an IV profile, tier, and level syntax structure is included in the IVS parameters syntax structure.

In some embodiments, flexibility is restricted by requiring the same video codec standard be used for all video coding layers in an IV bitstream, as signaled by the ivs_codec_id syntax element in the IVS parameters. For example, allowing separate codecs for each video coding layer/component type would disadvantageously complicate the high-level syntax design, without a clearly demonstrated benefit.

In some embodiments, a syntax flag, ivs_all_codec_layers_au_aligned_flag, in the IVS parameters is provided to indicate if all video codec layers have access unit alignment. If this flag is not set, output units and video codec access units are not picture coding order aligned, so an output unit count syntax element is included in the IV output parameters.

In some embodiments, the camera parameters list, as described in section 8, is included. In some embodiments, syntax elements related to occupancy map coding are also included, as described in Section 3.

In some embodiments, additional syntax elements related to points for V-PCC may be included.

A syntax in accordance with some embodiments is provided below in Table 3.

TABLE 3

| | Descriptor |
|---|---|
| ivs_params( ) { | |
|   ivs_profile_tier_level( ) | |
|   ivs_codec_id | u(4) |
|   ivs_all_codec_layers_au_aligned_flag | u(1) |
|   camera_params_list( ) | |
|   occupancy_map_threshold | u(10) |
|   occupancy_map_scaling | u(2) |
|   occupancy_map_packing_flag | u(1) |
|   if( !ivs_all_codec_layers_au_aligned_flag) { | |
|     iv_output_unit_count_bits_minus4 | u(12) |
|   ivs_points_info_present_flag | u(1) |
|   if( ivs_points_info_present_flag ) { | |

TABLE 3-continued

| | Descriptor |
|---|---|
|     points_info( ) [Ed. (JB): V-PCC seqeunce level points related syntax elements] | |
|   } | |
|   ivs_sp_vui_present_flag | u(1) |
|   if( ivs_sp_vui_present_flag ) | |
|     ivs_volume_range_present_flag | u(1) |
|     if( ivs_volume_range_present_flag ) { | |
|       ivs_bounding_rectangular_solid_flag | u(1) |
|       if ( !ivs_bounding_rectangular_solid_flag ) | u(1) |
|         volume info( ) [Ed. (JB): description of volume represented, in terms of range of view positions and orientations, and if infinite depth is represented.] | |
|     } | |
|     ivs_sp_avg_frame_rate_present_flag | u(1) |
|     if( ivs_sp_avg_frame_rate_present_flag ) | |
|       ivs_sp_avg_frame_rate | u(16) |
|   } | |
|   ivs_sp_extension_present_flag | u(1) |
|   if( ivs_sp_extension_present_flag ) { | |
|     while( more_rbsp_data( ) ) | |
|       ivs_sp_extension_data_flag | u(1) |
|   rbsp_trailing_bits( ) | |
| } | |

Table 4 provides ivs_codec_id types in accordance with some embodiments.

TABLE 4 ivs_codec_id types

| ivs_codec_id | Identifier | Reference specification |
|---|---|---|
| 0 | HEVC | [XX] |
| 1 | AVC | [XX] |
| 2 | VVC | [XX] |
| 3 . . . 15 | Reserved | |

In some embodiments, decoding using IV sequence parameters is performed as follows. Given inputs of a video codec bitstream containing one or more atlas layer groups, IV sequence parameters (including video codec type, camera parameters list, occupancy map parameters), and IV output unit parameters (including sequence of atlas parameters lists), outputs of the decoding are one or more decoded picture sequence groups each representing an atlas, each group (containing a texture picture sequence representing an atlas texture component, a depth picture sequence representing an atlas depth component, and an occupancy map sequence representing an occupancy map component) and one or more atlas patch occupancy map sequences. Notably, the video decoder to be invoked is determined by ivs_codec_id and the decoding and output process differs based on the value of the ivs_all_codec_layers_au_aligned_flag syntax element. In some embodiments, each IVS in the video codec bitstream: the IV sequence parameters are parsed and if (ivs_all_codec_layers_au_aligned_flag), for each output unit in the IVS: the IV output unit parameters are parsed and for each atlas in the output unit: the video decoding process is invoked for the coded picture in the texture layer with the texture decoded picture as output, the video decoding process is invoked for the coded picture in the depth layer with the depth decoded picture as output, video decoding process is invoked for the coded picture in the occupancy map layer with the decoded occupancy map picture as output, and atlas patch occupancy map generator is invoked, with the occupancy map decoded picture and atlas parameters as inputs, and the atlas patch occupancy map as output. Otherwise (ivs_all_codec_layers_au_aligned_flag equal to 0), for each output unit in the IVS: the IV output unit parameters are parsed and for each atlas in the output unit: the video decoding process is invoked for the coded picture in the texture layer, if any, the decoded texture picture targeted for the current output unit is output, the video decoding process is invoked for the coded picture in the depth layer, if any, the decoded depth picture targeted for the current output unit is output, the video decoding process is invoked for the coded picture in the occupancy map layer, if any, the decoded occupancy map picture targeted for the current output unit is output, and the atlas patch occupancy map generator is invoked, with the output occupancy map picture and atlas parameters as inputs, and the atlas patch occupancy map as output.

Discussion now turns to IV profile tier level according to some embodiments. In some embodiments, in the profile, tier, level syntax structure, in addition to an overall profile, tier, and level, syntax elements are included that indicate the max number of video codec layers that may be present in the bitstream, the max video codec level of each layer.

In some embodiments, the ivs_ptl_level_idc syntax element imposes limits of each of the max number of video codec layers that may be present in the bitstream, and the max video codec level of each layer. Providing these additional syntax elements provides additional information.

In some embodiments, a syntax element is included to indicate if point cloud reconstruction is recommended for the bitstream, and to indicate if perfect point cloud reconstruction is enabled for the bitstream, meaning that it is possible for a decoder/renderer client to operate a decoding process on the bitstream and the point cloud rendering process on the decoder outputs and get an exact matching point cloud sequence to the reference decoder and reference point cloud rendering processes. Whether or not a client decoder chooses to support exact point cloud reconstruction is a decoder conformance characteristic, and not a bitstream characteristic.

A syntax structure according to some embodiments is provided in Table 5.

TABLE 5

| | Descriptor |
|---|---|
| ivs_profile_tier_level( ) { | |
|   ivs_tier_flag | u(1) |
|   ivs_profile_idc | u(7) |
|   ivs_level_idc | u(8) |
|   ivs_max_codec_layers_minus1 | u(8) |
|   ivs_layer_max_level_idc | u(8) |
|   ivs_points_rendering_idc | u(4) |
|   if (ivs_points_rendering_idc > 0 ) | |
|     ivs_points_level_idc | u(8) |
|   else | |
|     ivs_ptl_reserved_8bits | u(4) |
|   ivs_ptl_reserved_4bits | u(4) |
| } | |

Discussion now turns to IV output unit parameters according to some embodiments. In some embodiments, an IV output unit parameters syntax structure is provided, which includes parameters relevant to the generation of the IV decoded outputs, including the atlas parameters list, which describes the patches in each atlas.

In some embodiments, it is required that all video codec layers follow the same picture coding order and an output unit is aligned with an access unit. In some embodiments, this restriction is imposed in the Immersive Main 10 profile.

In some embodiments, to enable V-PCC, which allows different picture coding orders for the different attribute types, there is not be a general restriction against this flexibility. However, in some embodiments, the coding order of the IV output unit params NAL unit is restricted to be included in the same IV output unit for which the video decoder will output the corresponding texture and depth pictures. In some embodiments, an iv_output_unit_count syntax element is included when the layers are not aligned, to be used to for alignment across video coding layers.

Parameters and syntax in accordance with some embodiments are provided in Table 6.

TABLE 6

| | Descriptor |
|---|---|
| iv_output_unit_params( ) { | |
|   atlas_params_present_flag | u(1) |
|   if( ! atlas_params_present_flag ) { | |
|     atlas_params_list( ) | |
|   if( !ivs_all_codec_layers_au_aligned_flag) { | |
|     iv_output_unit_count | u(v) |
|   ivs_oup_vui_present_flag | u(1) |
|   if( ivs_oup_vui_present_flag ) { | |
|     ivs_oup_num_points_present_flag | u(1) |
|     if( ivs_oup_num_points_present_flag ) | |
|       ivs_oup_num_points | u(32) |
| } | |

TABLE 6-continued

| | Descriptor |
|---|---|
|   ivs_oup_extension_present_flag | u(1) |
|   if( ivs_oup_extension_present_flag ) { | |
|     while( more_rbsp_data( ) ) | |
|       ivs_oup_extension_data_flag | u(1) |
|   rbsp_trailing_bits( ) | |
| } | |

Discussion now turns to an IV output unit delimiter according to some embodiments. In some embodiments, an IV output unit delimiter serves to simplify the detection of the boundary between IV output units.

In an embodiment, an IV output unit delimiter contains no payload. An example syntax is provided in Table 7.

TABLE 7

| | Descriptor |
|---|---|
| iv_output_unit_delimiter_rbsp( ) { | |
| } | |

Discussion now turns to modification to HEVC for IV NUT value allocation according to some embodiments. In some embodiments, an HEVC NUT value is allocated from a reserved non-VCL value as indicated in Table 8.

TABLE 8

| | | NAL Unit Type codes and NAL Unit Type Classes | |
|---|---|---|---|
| nal_unit_type | Name of nal_unit_type | Content of NAL unit and RBSP syntax structure | NAL unit type class |
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP SLNR VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |

TABLE 8-continued

NAL Unit Type codes and NAL Unit Type Classes

| nal_unit_type | Name of nal_unit_type | Content of NAL unit and RBSP syntax structure | NAL unit type class |
|---|---|---|---|
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 | IVS_NUT | Defined in ISO/IEC 23090-X | non-VCL |
| 42 ... 47 | RSV_NVCL42 ... RSV_NVCL47 | Reserved | non-VCL |
| 48 ... 63 | UNSPEC48 ... UNSPEC63 | Unspecified | non-VCL |

Discussion now turns to a VPS and NAL unit header mult-layer design using HEVC Annex F for an IV profile according to some embodiments. In some embodiments, usage of the HEVC Annex F VPS extension for a MIV profile is provided. In the following, some key concepts from the existing HEVC multi-layer design in Annex F are first described.

Notably, with respect to HEVC Annex F, HEVC uses a two-byte NAL unit header, the syntax of which is provided in Table 9. It includes 6 bits allocated to nuh_layer_id.

TABLE 9

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

HEVC defines a base Video Parameter Set (VPS) in section 7, and a VPS extension in Annex F. Annex F describes an Independent Non-Base Layer Decoding (IN-BLD) capability, in which an independently coded layer may have a nuh_layer_id value that is not equal to 0.

The base VPS includes a vps_max_layers_minus1 syntax element. The VPS extension includes the syntax elements splitting_flag, scalability_mask_flag[i], dimension_id_len_minus1[j], and dimension_id[i] [j], and direct_dependency_flag[i] [j]. These syntax elements are used to indicate the characteristics of each layer, including derivation of the ScalabilityId variable, and any dependency relationship between layers.

The ScalabilityId variable is mapped to scalability dimensions as shown in Table 10.

TABLE 10

Mapping of ScalabilityId to scalability dimension

| Scalability mask index | Scalability dimension | ScalabilityId mapping |
|---|---|---|
| 0 | Texture or depth | DepthLayerFlag |
| 1 | Multiview | ViewOrderIdx |
| 2 | Spatial/quality scalability | DependencyId |
| 3 | Auxiliary | AuxId |
| 4-15 | Reserved | |

Annex G defines the multi-view main profile, in which an enhancement layer is inter-layer predicted from the base layer, and defines several SEI messages related to carriage of camera parameters and depth. Annex I defines the 3D Main profile.

Furthermore, in the MIV WD1, one or more atlases are coded, each with a texture and depth component. Each atlas component can be coded as a separate layer within the same bitstream, each with a different value of nuh_layer_id. The layers containing an atlas texture component and corresponding atlas depth component are referred to as a layer pair. In a layer pair, the atlas depth component layer is independent, and does not allow inter-layer prediction from the atlas texture component layer.

In some embodiments, an HEVC Annex F VPS extension usage is provided. In some embodiments, with explicit video coding of the occupancy map, an occupancy map component would also be HEVC coded for each atlas, in a separate layer. In some embodiments, the IV specification as discussed herein includes an atlas layer group, with components for texture, depth, and occupancy map (and optionally for additional attributes for V-PCC.)

In some embodiments, allocation of three new entries in the HEVC Annex F Scalability mask table are provided as shown in Table 11, for AtlasId, OccupancyFlag, and AttributeId, utilizing 3 of the 12 reserved values, with 9 reserved values remaining.

In some embodiments, AtlasId is used to indicate the Atlas Id value of a layer. In some embodiments, the existing DepthLayerFlag is used to indicate the atlas depth component layer vs. the texture component layer. In some embodiments, OccupancyFlag is used to indicate an atlas occupancy map component layer. These values may be derived from the nuh_layer_id, according to the VPS extension parameters, using the ScalabilityId value.

In some embodiments, other attributes, including Material ID, Transparency, Reflectance, and Normals, can be indicated using AttributeId.

TABLE 11

Mapping of ScalabilityId to scalability dimensions according to some embodiments

| Scalability mask index | Scalability dimension | ScalabilityId mapping |
|---|---|---|
| 0 | Texture or depth | DepthLayerFlag |
| 1 | Multiview | ViewOrderIdx |
| 2 | Spatial/quality scalability | DependencyId |
| 3 | Auxiliary | AuxId |
| 4 | Atlas of patches | AtlasId |

TABLE 11-continued

Mapping of ScalabilityId to scalability dimensions according to some embodiments

| Scalability mask index | Scalability dimension | ScalabilityId mapping |
|---|---|---|
| 5 | Occupancy map | OccupancyFlag |
| 6 | Attribute type | AttributeId |
| 7-15 | Reserved | |

In some embodiments, the MIV Immersive Main 10 profile, as described in section 6, does not impose any additional requirements on the value of nuh_layer_id for the layers, and the existing HEVC Annex F VPS extension design provides flexibility in how to signal syntax elements to derive the proper value of ScalabilityId variable.

Discussion now turns to syntax usage according to some embodiments. In some embodiments, a simple and efficient method of using the VPS to properly set the ScalabilityId value for the MIV Immersive Main 10 profile is provided herein. In some embodiments, the IV specification discussed herein does not specifically require the use of this recommended syntax. However, In some embodiments, the syntax is put into use in a test model.

Table 12 provides a description of how the splitting_flag, scalability_mask[i], nuh_layer_id, and additional syntax elements may be used, in addition to some description of the existing HEVC Annex F design in accordance with some embodiments. In some embodiments, splitting_flag is set equal to 1 to indicate a simple mapping of the bits of nuh_layer_id to multi-layer characteristics. In some embodiments, scalability_mask_flag[i] is set equal to 1000110000000000 (with each bit representing a binary array value) to indicate the layer dimensions to be used are 0 (for DepthLayerFlag), 4 (for AtlasId), and 5 (for OccupancyFlag). In some embodiments, dimension_id_len_minus1[1] is set equal to log 2(NumAtlases) to indicate the number of bits needed to represent AtlasId. In some embodiments, dimension_id_len_minus1[2] is set equal to 1 to indicate that one bit is needed to represent OccupancyFlag.

TABLE 12

Proposed use of scalability _mask[ i ] and nuh_layer_id for MIV/V-PCC

| | scalability_mask bit position, i | | | | | | |
|---|---|---|---|---|---|---|---|
| | 0 | 1 | 2 | 3 | 4 | 5 | 6-15 |
| ID variable name | DepthLayerFlag | ViewId | DependencyId | AuxId | AtlasId | OccupancyFlag | Reserved |
| ID variable value meaning | texture (0) vs. depth (1) | index of MV-HEVC style multi-view layer | index of spatial/SNR scalability layer | index of auxiliary picture layer | altas index | not occupancy map (0) vs. occupancy map (1) | — |
| bits allocated in nuh_layer_id when splitting flag used and scalability_mask[i] value equals 1 | 1 | log2(max num MV-HEVC style multi view layers) | log2(max num spatial or SNR scalability layers) | log2(max num auxiliary picture layers + 1) | log2(Num Atlases) | 1 | — |
| Proposed MIV/V-PCC value of scalability_mask[ i ] | 1 | 0 (not used) | 0 (not used) | 0 (not used) | 0 (when NumAtlases = 1) or 1 (when NumAtlases > 1) | 1 | 0 |

Table 13 shows the recommended number of bits to be signaled in dimension_id_len_minus1[j] for each value of i in the scalability_mask[i] bit position, for various numbers of atlases, in accordance with some embodiments.

TABLE 13

Recommended values of dimension_id_len_minus1[j]

| | | i, in scalability_mask[ i ] | | | | | | |
|---|---|---|---|---|---|---|---|---|
| | | 0 | 1 | 2 | 3 | 4 | 5 | 6-15 |
| | | | | j, in dimension_id_len_minus1[ j ] | | | | |
| | | 0 | — | — | — | 1 | 2 | — |
| | | | | | ID variable name | | | |
| | | DepthLayer Flag | ViewId | DependencyId | AuxId | AtlasId | Occupancy Flag | Reserved |
| num atlases | 1 atlas | 1 | — | — | — | 0 | 1 | 0 |
| | 2 atlases | 1 | — | — | — | 1 | 1 | 0 |
| | 4 atlases | 1 | — | — | — | 2 | 1 | 0 |

Table 14 shows an example with one atlas. nuh_layer_id equal to 0 is used for the atlas texture component layer, nuh_layer_id equal to 1 is used for the atlas depth component layer, and nuh_layer_id equal to 2 is used for the atlas occupancy map component layer.

TABLE 14

When one atlas is used

| | nuh_layer_id | DepthLayerFlag | AtlasId | OccupancyFlag | ScalabilityId (in binary) |
|---|---|---|---|---|---|
| num bits allocated | — | 1 | 0 | 1 | 2 |
| Atlas texture component | 0 | 0 | — | 0 | 00 |
| Atlas depth component | 1 | 1 | — | 0 | 10 |
| Atlas occupancy map component | 2 | 0 | — | 1 | 01 |

Tables 15 and 16 show similar examples for two or four atlases

TABLE 15

When two atlases are used (A and B)

| | nuh_layer_id | DepthLayerFlag | AtlasId | OccupancyFlag | ScalabilityId (in binary) |
|---|---|---|---|---|---|
| num bits allocated | — | 1 | 1 | 1 | 3 |
| Atlas A texture component | 0 | 0 | 0 | 0 | 000 |
| Atlas A depth component | 1 | 1 | 0 | 0 | 100 |
| Atlas A occupancy map component | 2 | 0 | 0 | 1 | 001 |
| Atlas B texture component | 3 | 0 | 1 | 0 | 010 |
| Atlas B depth component | 4 | 1 | 1 | 0 | 110 |
| Atlas B occupancy map component | 5 | 0 | 1 | 1 | 011 |

TABLE 16

When four atlases are used (A, B, C, and D)

| | nuh_layer_id | DepthLayerFlag | AtlasId (in binary) | OccupancyId | ScalabilityId (in binary) |
|---|---|---|---|---|---|
| num bits allocated | — | 1 | 2 | 1 | 4 |
| Atlas A texture component | 0 | 0 | 00 | 0 | 0000 |
| Atlas A depth component | 1 | 1 | 00 | 0 | 1000 |
| Atlas A occupancy map component | 2 | 0 | 00 | 1 | 0001 |
| Atlas B texture component | 3 | 0 | 01 | 0 | 0010 |
| Atlas B depth component | 4 | 1 | 01 | 0 | 1010 |
| Atlas B occupancy map component | 5 | 0 | 01 | 1 | 0011 |
| Atlas C texture component | 6 | 0 | 10 | 0 | 0100 |
| Atlas C depth component | 7 | 1 | 10 | 0 | 1100 |
| Atlas C occupancy map component | 8 | 0 | 10 | 1 | 0101 |
| Atlas D texture component | 6 | 0 | 10 | 0 | 0110 |
| Atlas D depth component | 7 | 1 | 10 | 0 | 1110 |
| Atlas D occupancy map component | 8 | 0 | 10 | 1 | 0111 |

Discussion now turns to camera parameters signalling according to some embodiments. For example MIV WD1 includes signaling of camera parameters in the camera_params_list( ) syntax structure. Intrinsic parameters and extrinsic parameters are both included. The extrinsic parameters indicate the (x, y, z) position and (yaw, pitch, roll) orientation of each camera associated with a particular view.

In some embodiments, efficient signaling of cameras is provided in a fixed grid pattern, which is applicable to the 6-camera and 8-camera configurations used in V-PCC. In some embodiments, instead of explicitly signal each camera's (x, y, z) orientation with 32-bits per dimension, granularity is signaled in 32-bits for each dimension. Individual camera positions are then signaled based on that granularity. For example, for a V-PCC 6-camera configuration, each camera position is represented by the center of the projection plane of the face of the bounding rectangular solid. In some embodiments, the granularity in each dimension is half the value of the bounding box dimension's length. In some embodiments, a yaw_pitch_roll_idc syntax element do not explicitly signal yaw, pitch, and roll parameters for special cases, which include camera arrays with parallel cameras, and the V-PCC 6-camera and 8-camera configurations.

Figure 5:
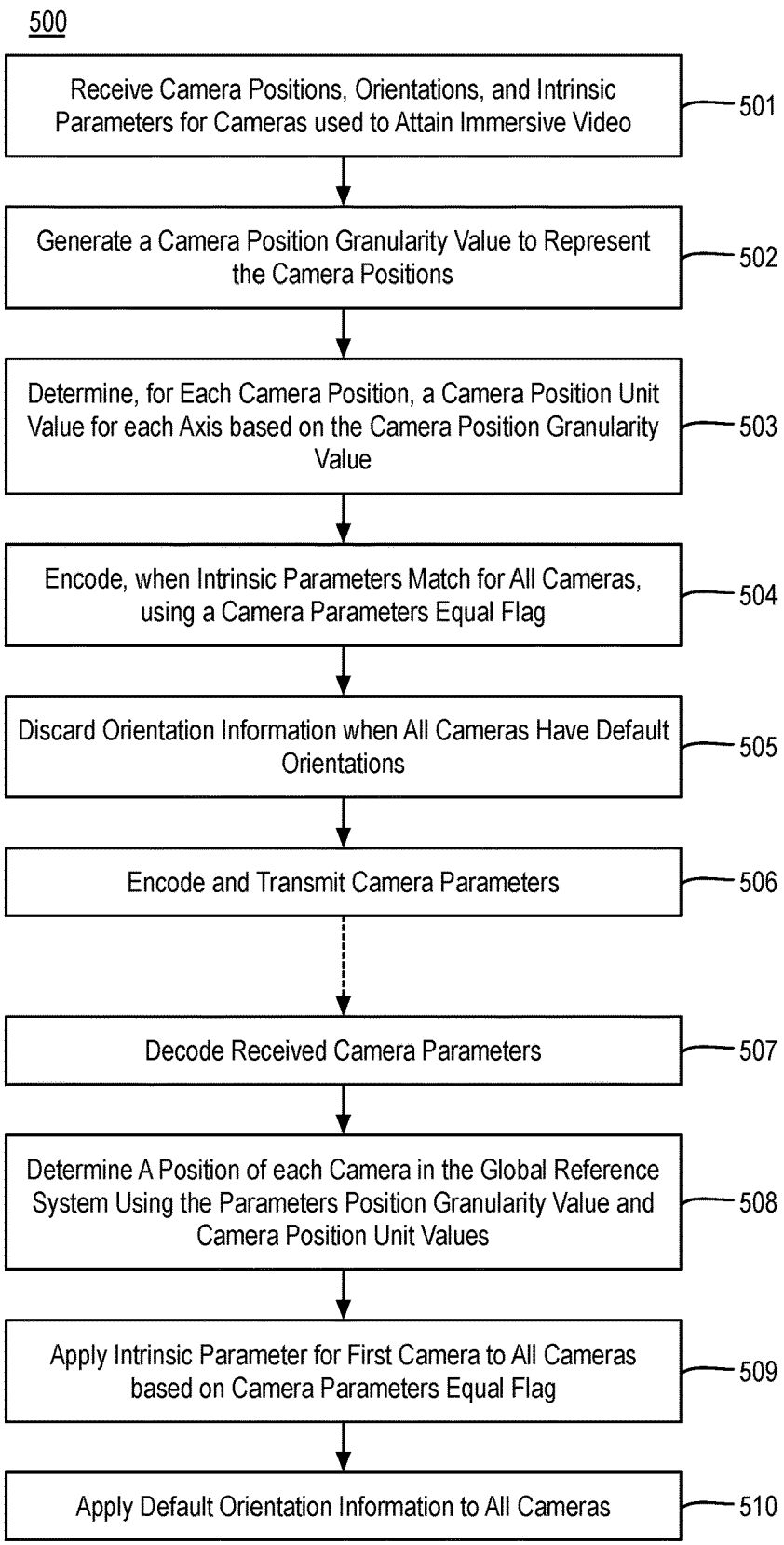
FIG. 5 is a flow diagram illustrating an example process for immersive video coding including coding of camera parameters.

FIG. 5 is a flow diagram illustrating an example process 500 for immersive video coding including coding of camera parameters, arranged in accordance with at least some implementations of the present disclosure. Process 500 may include one or more operations 501-510 as illustrated in FIG. 5. Process 500 may be performed by any device of system discussed herein. In some embodiments, operations 501-506 are performed by an encoder and operations 507-510 are performed by a decoder.

Processing begins at operation 501, where, for particular immersive video, camera positions, camera orientations, and intrinsic parameters are received. For example, the camera positions, camera orientations, and intrinsic parameters describe a number cameras (real or virtual) used to attain the particular immersive video. In some embodiments, the camera parameters are to signal intrinsic (imaging) parameters of the plurality of cameras and extrinsic parameters (location and orientation) of the cameras.

Figure 6:
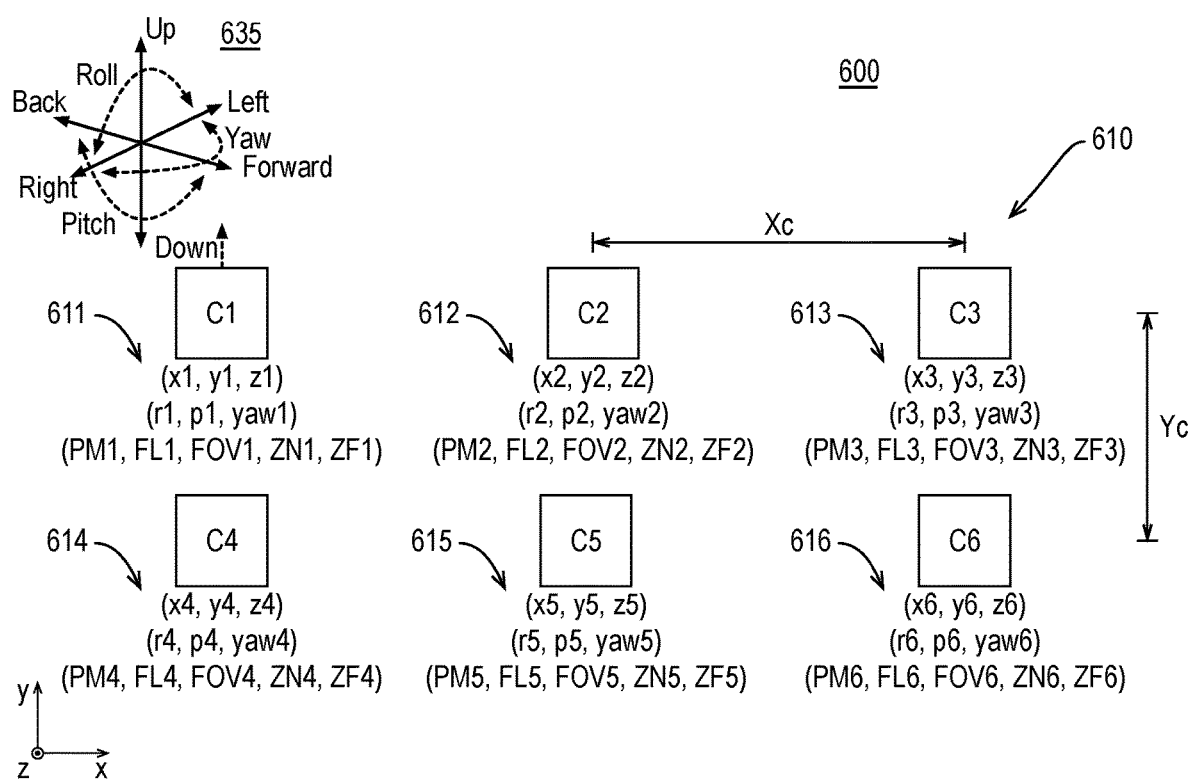
FIG. 6 illustrates an example camera array and corresponding camera parameters pertaining to immersive video coding.

FIG. 6 illustrates an example camera array 610 and corresponding camera parameters 600 pertaining to immersive video coding, arranged in accordance with at least some implementations of the present disclosure. For example, camera array 610 may be used to attain input views 101 of a scene. That is, camera array 610 may be used for immersive video generation or capture. In the example of FIG. 6, camera array 610 includes six cameras C1-C6 in a grid pattern such that cameras C1-C3 are in a first row and cameras C4-C6 are in a second row. However, camera array 610 may have any number of cameras in any spacing layout. Furthermore, camera array 610 is illustrated such that cameras C1-C6 are all aligned in the x-y plane. However, cameras of camera array 610 may be positioned in any manner.

Each of cameras C1-C6 has corresponding camera parameters 611, 612, 613, 614, 615, 616, respectively. As shown camera parameters 611 may include a position of camera C1, an orientation of camera C1, and imaging parameters for camera C1. As shown, position parameters include coordinates (x1, y1, z1) of camera C1. Orientation parameters include roll, pitch, and yaw values (r1, p1, yaw1) or quaternion parameters that define orientation of camera C1. As shown with respect to camera C1, each of cameras C1-C6 may be positioned and oriented throughout 3D space with the position and orientation characterized as 6-DOF motion 635, which shows each of cameras C1-C6 may move with translation: forward/back (e.g., in a z-direction), up/down (e.g., in a y-direction), right/left (e.g., in an x-direction) and rotation: rotating with yaw (e.g., angle around the y-axis), roll (e.g., angle around the x-axis), and pitch (e.g., angle around the z-axis). Intrinsic or imaging parameters include one or more of a projection method or mode (PM1), a focal length (FL1), a field of view (FOV1), a Znear value (ZN1), a Zfar value (ZF1), depth quantization parameters (not shown), and others as discussed herein. For example, the projection mode may indicate one of omnidirectional content, normal perspective content, or orthogonal content for the camera. That is, the projection mode may indicate one of an omnidirectional projection mode, a normal perspective projection mode, or an orthographic projection mode.

Similarly, camera parameters 612, 613, 614, 615, 616 include like position, orientation, and imaging parameters for each of cameras C2-C6, respectively. Notably, such camera parameters 611, 612, 613, 614, 615, 616 or portions thereof as represented by camera parameters 102 are encoded into bitstream 107 and decoded by decoder system 300 for use in view synthesis and other applications. The techniques discussed herein provide for efficient coding of camera parameters 612, 613, 614, 615, 616 of camera array 610.

Returning to FIG. 5, processing continues at operation 502, where one or more camera position granularity values are generated for each of the 3D axes to represent the positions of the cameras in 3D space. In some embodiments, a single camera position granularity value is used. In some embodiments, a camera position granularity value is used for each axis. For example, the granularity value may be representative of a particular distance along an axis in 3D space. In some embodiments, the granularity value is set as a smallest distance between any of cameras C1-C6 in the particular dimension. In some embodiments, the granularity value is set as a fraction of a smallest distance between any of cameras C1-C6 in the particular dimension (e.g., one-half, one-fourth, or one-eighth of the smallest distance between any of cameras). In some embodiments, the granularity value is set as a smallest delta between any of the distances between any of cameras C1-C6 in the particular dimension. For example, each distance between C1-C6 in cameras may be determined (in each dimension) and a smallest delta between any of the distances may be used as the granularity value.

Processing continues at operation 503, where, for each camera position, a camera position unit value is determined for each axis of the camera based on the one or more camera position granularity values. For example, camera C5 may be M number of camera position granularity values from the origin in the x-dimension and N number of camera position granularity values from the origin. In some embodiments, the camera position unit values are based on an origin in the global reference coordinate system. In other embodiments, camera position unit values are relative to another camera in the array. For example, the camera position unit value for C5 may be M number of camera position granularity values in the x-axis from the x-position of camera C4 and 0 camera position granularity values in the y-axis from the y-position of camera C4. That is, camera position unit values may be based on a position from an origin, another camera, or any other point in the global reference coordinate system.

Processing continues at operation 504, where intrinsic parameters are analyzed for the cameras and, when the intrinsic parameters of a particular type match for all cameras, a camera parameters equal flag is set and the particular parameter and the flag are encoded for the camera set. That is, when all intrinsic parameters of a particular type match for all cameras, the parameter is coded only once and the parameters equal flag is set so a decoder may apply the parameter to all the cameras. In some embodiments, a flag may be set so the parameter is repeated for some of the cameras until, for a particular camera, the flag is set to off and a new parameter is transmitted for that camera and all subsequent cameras.

Processing continues at operation 505, where orientation information is discarded for the cameras when all the cameras have default orientations. In some embodiments, yaw, pitch, and roll for each of the cameras may be set as zero or other default parameters and the yaw, pitch, and roll for each of the cameras may be discarded. Instead, no values or a flag indicating default values may be coded for the cameras thereby saving substantial bandwidth. Alternatively, single yaw, pitch, and roll values may be coded and an orientation parameters equal flag may be set (in analogy to the camera parameters equal flag) and the yaw, pitch, and roll values may be applied to all cameras. In yet another embodiment, single yaw, pitch, and roll baseline values may be transmitted and delta values for each of the cameras (relative to the yaw, pitch, and roll baseline values, many of which are expected to be zero) may be transmitted.

Processing continues at operation 506, where the camera parameters are coded and transmitted to another device such as a decoder or a memory storage device. For example, the coded camera parameters may be included into a bitstream and/or packetized and provided, in the compressed representation, to a decoder or a memory storage device (for eventual use by a decoder).

Processing continues at operation 507, where the coded camera parameters are received. For example, the coded camera parameters may be received by decoder system 300. As shown, the coded camera parameters may be decoded and applied to reconstruct a camera array and for eventual use in generating a viewport in reconstructed immersive video. In some embodiments, process 500 includes receiving, for a number cameras corresponding to immersive video, camera parameters to signal intrinsic parameters of the cameras and extrinsic parameters of the cameras. In some embodiments, the camera parameters are absent one or more first intrinsic parameters (e.g., of a first type) for some of the plurality of cameras and absent one or more first extrinsic parameters for any of the plurality of cameras. For example, a camera parameters equal flag may be employed such that an intrinsic camera parameter may only be provided for one of the cameras, or a representative one of the cameras. Furthermore, default extrinsic parameters may be used such that, for at least some of the extrinsic parameters (e.g., yaw, pitch, and roll) no parameters are included in the bitstream at all.

Furthermore, the coded camera parameters may include a camera position granularity value representative of displacement of the cameras for each axis in a global reference coordinate system, as discussed with respect to operation 502, such that the camera position granularity value is to indicate a signaling precision of camera positions in the global reference coordinate system corresponding to the immersive video and a camera position units value for one or more of an x-axis, a y-axis, and a z-axis for a first camera of the cameras such that each camera position units value is to indicate a position of the first camera in the global reference coordinate system based on the camera position granularity value.

Processing continues at operation 508, where positions of the cameras in the global reference coordinate system are determined using the camera position granularity value and the camera position units values. The positions of the cameras in the global reference coordinate system may be determined using any suitable technique or techniques. In some embodiments, determining the position of a first camera in the global reference system includes multiplying the camera position granularity value by each camera position units value for the first camera to determine the position of the first camera in the global reference coordinate system. In some embodiments, determining the position of a first camera in the global reference system includes multiplying a camera position granularity value by each camera position units value for the first camera and adding each resultant product by a value such as zero (if based on the origin) or another value corresponding to a reference position upon which the first camera is based (such as another camera in the array). In some embodiments, an x-axis camera position units value is multiplied by an x-axis camera position granularity value and the product is added to a reference x-axis position to determine the x-axis location of the camera, a y-axis camera position units value is multiplied by a y-axis camera position granularity value and the product is added to a reference y-axis position to determine the y-axis location of the camera, and a z-axis camera position units value is multiplied by a z-axis camera position granularity value and the product is added to a reference z-axis position to determine the z-axis location of the camera. In some embodiments, the z-axis position is not signaled (e.g., no z-axis camera position units value is provided) and the z-axis position is a default value such as zero. In some embodiments, the camera position granularity value is a fixed point.

Processing continues at operation 509, where the intrinsic parameter for the first (or reference) camera is applied to all other cameras based on the camera parameters equal flag. In some embodiments, decoded intrinsic camera parameters are determined for each of the plurality of cameras by decoding a first decoded intrinsic parameter for a first camera of the cameras from the plurality of camera parameters and applying the first decoded intrinsic parameter to each of the plurality of cameras based on the received camera parameters equal flag discussed above. That is, a single parameter is received for a particular intrinsic parameter type (e.g., FOV, FL, MP, etc.) and then used for all cameras based on the camera parameters equal flag for the particular intrinsic parameter type. It is noted that in some embodiments, camera parameters equal flag may indicate intrinsic parameters of all types are the same for all the cameras. In some embodiments, the decoded intrinsic parameter comprises one of a projection method, a projection plane width, a longitudinal range, a field of view, or a focal length. In some embodiments, process 500 includes receiving depth quantization parameters for the first camera and a depth quantization parameters equal flag for the plurality of cameras and assigning the depth quantization parameters to each of the plurality of cameras in response to the depth quantization parameters equal flag.

Processing continues at operation 510, where a default orientation is applied to all cameras in response to no orientation information being received in the bitstream (e.g., the received camera parameters). As discussed, in some embodiments, no information is provided from the encoder for one or all of yaw, pitch, and roll for the camera array. In some embodiments, a decoded extrinsic parameter is applied to each of the cameras as a default parameter based on the absence of the first extrinsic parameters. In some embodiments, the extrinsic parameter is yaw and the applied default parameter is zero yaw. In some embodiments, the extrinsic parameter is pitch and the applied default parameter is zero pitch. In some embodiments, the extrinsic parameter is roll and the applied default parameter is zero roll. As discussed, in other embodiments, a single value may be received for each of one or more of yaw, pitch, and roll as well as a orientation equal flag, and the single value may be applied for all cameras in response to the orientation equal flag. In yet other embodiments, reference values for yaw, pitch, and roll and difference values are decoded for each camera such that the yaw value for a particular camera is the reference yaw plus the difference value yaw for the particular camera, the pitch value for a particular camera is the reference pitch plus the difference value pitch for the particular camera, and the roll value for a particular camera is the reference roll plus the difference value roll for the particular camera.

Discussion now turns to camera parameters list syntax according to some embodiments. MIV WD1 provides a camera parameters list syntax as shown in Table 17.

TABLE 17

| | Descriptor |
|---|---|
| camera_params_list( ) { | |
| num_cameras_minus1 | u(16) |
| for ( i= 0; i <= num_cameras_minus1; i++) { | |
| cam_pos_x[ i ] | u(32) |
| cam_pos_y[ i ] | u(32) |
| cam_pos_z[ i ] | u(32) |
| cam_yaw[ i ] | u(32) |
| cam_pitch[ i ] | u(32) |
| cam_roll[ i ] | u(32) |
| } | |
| intrinsic_params_equal_flag | u(1) |
| for ( i = 0; i <= intrinsic_params_equal_flag ? 0 : num_cameras_minus1; i++ ) | |
| camera_intrinsics( [ i ] ) | |
| depth_quantization_params_equal_flag | u(1) |
| for ( i = 0; i <= depth_quantization_equal_flag ? 0 : num_cameras_minus1; i++ ) | |
| depth_quantization( [ i ] ) | |
| } | |

In some embodiments, a camera parameters list syntax is employed as shown in Tables 18 and 19.

TABLE 18

| | Descriptor |
|---|---|
| camera_params_list( ) { | |
| num_cameras_minus1 | u(16) |
| cam_pos_x_granularity | u(32) |
| cam_pos_y_granularity | u(32) |
| cam_pos_z_granularity | u(32) |
| yaw_pitch_roll_idc | u(2) |
| for ( i= 0; i <= num_cameras_minus1; i++) { | |
| cam_pos_x[ i ] | se(v) |
| cam_pos_y[ i ] | se(v) |
| cam_pos_z[ i ] | se(v) |
| if (yaw_pitch_roll_idc == 1) { | |
| cam_yaw[ i ] | u(16) |
| cam_pitch[ i ] | u(16) |
| cam_roll[ i ] | u(16) |
| } | |
| } | |
| intrinsic_params_equal_flag | u(1) |
| for ( i = 0; i <= intrinsic_params_equal_flag ? 0 : num_cameras_minus1; i++ ) | |
| camera_intrinsics( [ i ] ) | |
| depth_quantization_params_equal_flag | u(1) |
| for ( i = 0; i <= depth_quantization_equal_flag ? 0 : | |

TABLE 18-continued

| | Descriptor |
|---|---|
| num_cameras_minus1; i++ ) | |
| depth_quantization( [ i ] ) | |
| } | |

TABLE 19

| yaw_pitch_roll_idc | Description |
|---|---|
| 0 | yaw, pitch, roll not signaled, all values equal to 0 |
| 1 | yaw, pitch, roll explicitly signaled per camera |
| 2 | yaw, pitch, roll not signaled, values derived for 6 cameras in rectangular bounding box |
| 3 | yaw, pitch, roll not signaled, values derived for 8 cameras |

Herein, some of the syntax elements are defined, according to some embodiments, as follows. The syntax element camera_params_list( ) specifies a list of cameras representing the 3D scene. The syntax element num_cameras_minus1 plus 1 indicates the number of cameras in the camera list. The value of num_cameras_minus1 shall be in the range of 0 to 65534. The value of 65535 may be specified in the future by ISO/IEC. The variable NumViews is set equal to num_cameras_minus1 plus 1. The syntax elements cam_pos_x_granularity, cam_pos_y_granularity, and cam_pos_z_granularity are unsigned fixed point 16.16 values that indicate the signaling precision of the cam_pos_x[i], cam_pos_y[i], and cam_pos_z[i] syntax elements, respectively, in meters in the global reference coordinate system. The syntax element yaw_pitch_roll_idc indicates the signalling mechanism for the cam_yaw[i], cam_pitch[i], and cam_roll[i] syntax elements, as described in Table 14. The syntax element cam_id_present_flag indicates that the cam_view_id[i] syntax element is present. The syntax element cam_view_id[i] specifies the view identifier of the i-th camera. When not present, the value of cam_view_id[i] is inferred to be equal to i. The syntax element cam_pos_x[i] specifies in units of cam_pos_x_granularity meters the X (back-to-front) coordinate of the location of the i-th camera in the global reference coordinate system. cam_pos_x[i] shall be in the range of −256 to 256, inclusive. The syntax element cam_pos_y[i] specifies in units of cam_pos_y_granularity meters the Y (lateral, left-to-right) coordinate of the location of the i-th camera in the global reference coordinate system. cam_pos_y[i] shall be in the range of −256 to 256, inclusive. The syntax element cam_pos_z[i] specifies in units of cam_pos_z granularity meters the Z (down-to-up) coordinate of the location of the i-th camera in the global reference coordinate system. cam_pos_z[i] shall be in the range of −256 to 256, inclusive. The syntax elements cam_yaw[i], cam_pitch[i], and cam_roll[i] specify the yaw, pitch, and roll angles respectively, of the rotation that is applied to convert the global coordinate axes to the local coordinate axes of the i-th camera, in units of $2^{-16}$ degrees, in the global reference coordinate system. The syntax element intrinsic_params_equal_flag equal to 1 specifies that the intrinsic parameters virtual_camera_intrinsics( ) of the 0-th camera apply to all cameras in the camera parameters list. intrinsic_params_equal_flag equal to 0 specifies that the intrinsic parameters virtual_camera_intrinsics( ) are present for each camera in the dep( ) of the 0-th camera apply to all cameras in the camera parameters list. intrinsic_params_equal_flag equal to 0 specifies that the intrinsic parameters virtual_camera_intrinsics( ) are present for each camera in the camera parameters list. The syntax element depth_quantization_params_equal_flag equal to 1 specifies equal to 1 specifies that the depth quantization parameters in the depth_quantization( ) syntax structure of the 0-th camera apply to all cameras in the camera parameters list. A depth_quantization_params_equal_flag equal to 0 specifies that the depth quantization parameters in the depth_quantization( ) syntax structure are present for each camera in the camera parameters list.

The syntax element cam_type[v] indicates the projection method of the v-th camera. cam_type[v] equal to 0 specifies an ERP projection. cam_type[v] equal to 1 specifies a CMP projection. cam_type[v] equal to 2 specifies a perspective projection. cam_type values in range 3 to 255 are reserved for future use by ISO/IEC. The syntax elements projection_plane_width[v] and projection_plane_height[v] specify the horizontal and vertical resolutions of the camera projection plane, respectively, expressed in coded luma samples. The syntax elements erp_phi_min[v] and erp_phi_max[v] specify the longitude range (minimum and maximum values) for an ERP projection, in units of $2^{-16}$ degrees. erp_phi_min[v] and erp_phi_max[v] shall be in the range $-180*2^{16}$ to $180*2^{16}-1$, inclusive, in the global reference coordinate system. The syntax elements erp_theta_min and erp_theta_max specify the latitude range (minimum and maximum values) for an ERP projection, in units $2^{-16}$ degrees. erp_theta_min and erp_theta_max shall be in the range $-90*2^{16}$ to $90*2^{16}-1$, inclusive, in the global reference coordinate system. The syntax element cubic_map_type indicates the type of CMP projection. cubic_map_type equal to 0 specifies a full projection (with 6 packed faces). Values of cubic_map_type greater than 0 are reserved for future use by ISO/IEC. The syntax elements perspective_focal_hor and perspective_focal_ver are fixed point 16.16 values that specify in luma samples the horizontal and vertical components, respectively, of the focal of a perspective projection. The syntax elements perspective_center_hor and perspective_center_ver are fixed point 16.16 values that specify in luma samples the horizontal and vertical coordinates, respectively, of the principal point of a perspective projection (intersection of optical axis with image plane). The values of perspective_center_hor and perspective_center_ver shall be in the ranges of 0 to projection_plane width−1 and 0 to projection_plane_height−1, respectively. The syntax element quantization_law[v] indicates the type of depth quantization method of the v-th camera. quantization_law[v] equal to 0 specifies a uniform quantization of the inverse of depth values. Values of quantization_law[v] greater than 0 are reserved for future use by ISO/IEC. The syntax elements depth_near[v] and depth_far[v] are fixed point 16.16 values that specify the minimum and maximum depth values, respectively, in meters of the 3D scene captured by the v-th camera.

In some embodiments, syntax elements CamYaw[i], CamPitch[i], and CamRoll[i] (with underscores omitted) are derived according to the following pseudocode: if (yaw_pitch_roll_idc==0): [for (i=0; i=num_cameras_minus1; i++): CamYaw[i]=0. CamPitch[i]=0, CamRoll[i]=cam_roll[i]]; else if (yaw_pitch_roll_idc==1): [for (i=0; i=num_cameras_minus1; i++): CamYaw[i]=camyaw[i], CamPitch[i]=cam_pitch[i], CamRoll[i]=cam_roll[i]]; else if (yaw_pitch_roll_idc==2): [CamYaw[0]=0, CamYaw[0]=0, CamYaw[1]=//90 degrees, CamPitch[1]=0, CamYaw[2]=// 180 degrees, CamPitch[2]=0, CamYaw[3]=//270 degrees, CamPitch[3]=0, CamYaw[4]=0, CamPitch[4]=//90 degrees, CamYaw[4]=0, CamPitch[4]=//−90 degrees, for (i=0; i=num_cameras_minus1; i++): CamRoll[i]=0]; else if (yaw_pitch_roll_idc==3) . . . .

Discussion now turns to atlas parameters signaling according to some embodiments. MIV WD1 uses a simple method of describing the patches represented by each atlas in the atlas_params( ) syntax structure. For each patch in the atlas, the following information is signaled: (width, height) size of the patch, (x, y) position of the patch in the atlas, (x, y) position of the patch in the view, and 90° rotation of the patch between the atlas and the view. The V-PCC SCD has a more complicated method for signaling of patches in the patch data unit, which include inter-frame patch referencing of characteristics of the patch, and patch rotations in 3 dimensional space.

Figure 7:
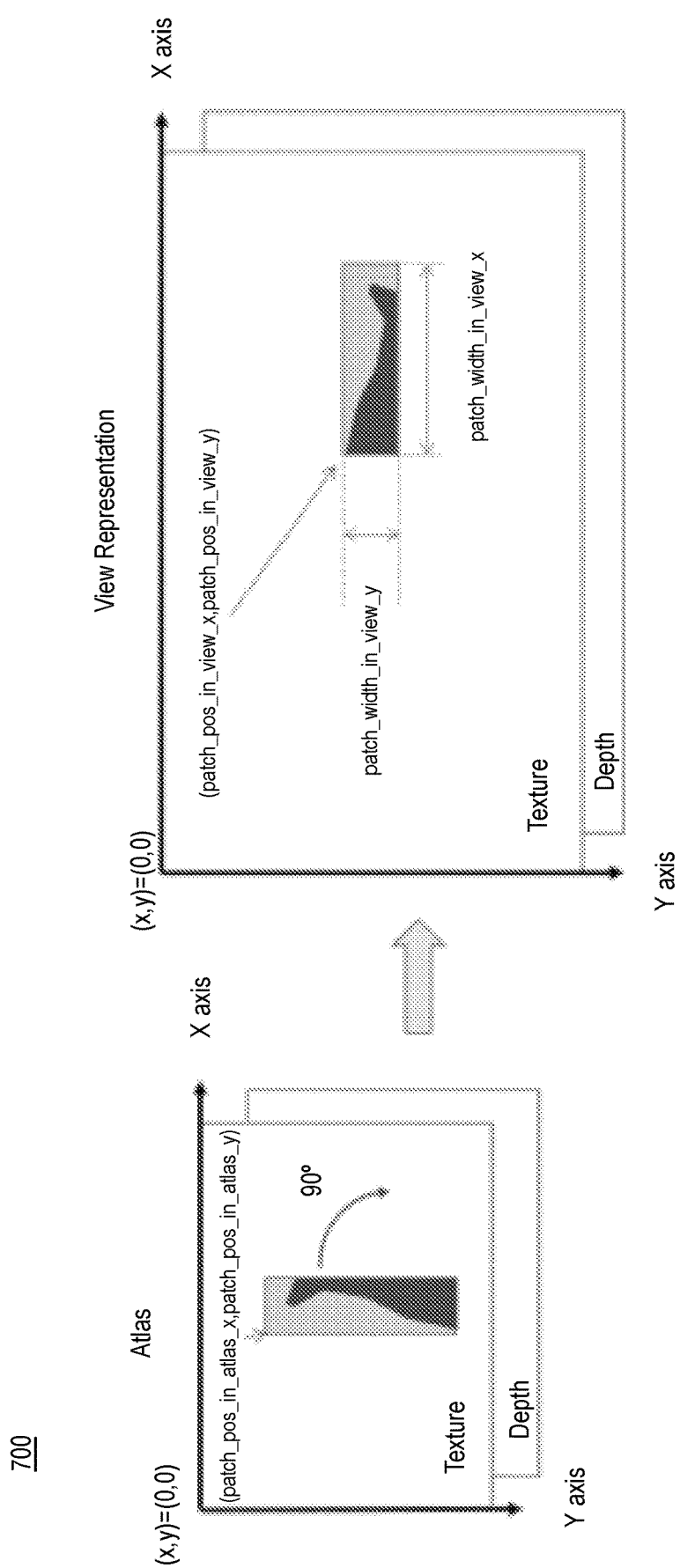
FIG. 7 illustrates example 90° rotation of a patch.

FIG. 7 illustrates example 90° rotation 700 of a patch, in in accordance with at least some implementations of the present disclosure. As shown in FIG. 7, in some embodiments, a patch may be rotated between an atlas picture and a view representation. In particular, when the parameter patch_rotation (as defined further herein below) is 1, a clockwise 90 degrees rotation is applied when mapping from the atlas to the view, as illustrated in FIG. 7.

Returning to discussion of atlas parameters signaling, in some embodiments, an atlas_params( ) syntax structure is used for IV coding with modifications to improve coding efficiency. In some embodiments, ue(v) entropy coding is used for some syntax elements, and u(v) coding is used for other syntax elements. The more complicated features of V-PCC patch coding are not addressed in the IV specification. Some of the more complicated features, such as inter-frame patch referencing are not expected to be supported in a MIV profile. Further study to determine how much gain is achieved through inter-frame patch referencing is desirable, to help determine if greater commonality with the V-PCC design could be achieved, or if separate syntax structures would be used.

Syntax for atlas parameters signaling in accordance with some embodiments are provided below in Tables 22 and 23 and semantics follow herein below. First, however, Tables 20 and 21 provide MIV WD1 atlas parameters syntax.

TABLE 20

MIV WD1 Atlas Parameters List Syntax

| atlas_params_list( ) { | |
| --- | --- |
| num_atlases_minus1 | u(8) |
| for ( i = 0; i <= num_atlases_minus1; i++ ) { | |
| atlas_id[ i ]; | u(8) |
| atlas_params( atlas_id[ i ] ) | |
| } | |
| } | |

TABLE 21

MIV WD1 Atlas Parameters Syntax

| | Descriptor |
| --- | --- |
| atlas_params( a ) { | |
| num_patches_minus1[ a ] | u(16) |
| for ( i = 0; i <= num_patches_minus1; i++ ) { | |
| view_id[ a ][ i ] | u(8) |
| patch_width_in_view[ a ][ i ] | u(16) |
| patch_height_in_view[ a ][ i ] | u(16) |
| patch_pos_in_atlas_x[ a ][ i ] | u(16) |
| patch_pos_in_atlas_y[ a ][ i ] | u(16) |
| patch_pos_in_view_x[ a ][ i ] | u(16) |

TABLE 21-continued

MIV WD1 Atlas Parameters Syntax

| | Descriptor |
|---|---|
|     patch_pos_in_view_y[ a ][ i ] | u(16) |
|     patch_rotation[ a ][ i ] | u(8) |
|    } | |
| } | |

Discussion now turns to atlas parameters list syntax according to some embodiments. In some embodiments, syntax for atlas parameters signaling is provided as shown in Tables 22 and 23.

TABLE 22

Atlas Parameters List Syntax in Accordance with Some Embodiments

| | |
|---|---|
| atlas_params_list( ) { | |
|   num_atlases_minus1 | ue(v) |
|   for ( i = 0; i <= num_atlases_minus1; i++ ) { | |
|     atlas_id[ i ]; | ue(v) |
|     atlas_params( atlas_id[ i ] ) | |
|   } | |
| } | |

TABLE 23

Atlas Parameters Syntax in Accordance with Some Embodiments

| | Descriptor |
|---|---|
| atlas_params( a ) { | |
|   num_patches_minus1[ a ] | u(16) |
|   atlas_width[ a ] | u(16) |
|   atlas_height[ a ] | u(16) |
|   for ( i = 0; i <= num_patches_minus1; i++ ) { | |
|     cam_id[ a ][ i ] | u(v) |
|     patch_width_in_view[ a ][ i ] | u(v) |
|     patch_height_in_view[ a ][ i ] | u(v) |
|     patch_pos_in_atlas_x[ a ][ i ] | u(v) |
|     patch_pos_in_atlas_y[ a ][ i ] | u(v) |
|     patch_pos_in_view_x[ a ][ i ] | u(v) |
|     patch_pos_in_view_y[ a ][ i ] | u(v) |
|     patch_rotation[ a ][ i ] | u(2) |
|   } | |
| } | |

Notably, in the atlas parameters syntax in accordance with some embodiments, the syntax elements num_atlases_minus1 and atlas_id are coded with ue(v) entropy coding (Exp-Golomb coding) and the syntax elements cam_id, patch_width_in_view, patch_height_in_view, patch_pos_in_atlas_x, patch_pos_in_atlas_y, patch_pos_in_view_x, and patch_pos_in_view_y are coded with u(v) coding (integer bit coding) where the allocated size is based on another element (as represented by v) as discussed further herein.

Herein, some of the syntax elements are defined, according to some embodiments, as follows. The syntax element atlas_params_present_flag equal to 1 indicates that the atlas_params_list( ) syntax structure is present. atlas_params_present_flag equal to 0 indicates that the atlas_params_list( ) syntax structure is not present. The syntax element indicates the output unit count of the current IV output unit. The number of bits used to represent iv_output_unit_count is iv_output_unit_count_bits_minus4+4. The syntax element ivs_oup_vui_present_flag equal to 1 indicates that output unit VUI parameters are present in the syntax structure. An ivs_oup_vui_present_flag equal to 0 indicates that output unit VUI parameters are not present. The syntax element ivs_oup_num_points_present_flag equal to 1 indicates that the ivs_oup_num_points syntax element is present. ivs_oup_num_points_present_flag equal to 0 indicates that the ivs_oup_num_points syntax element is present. The syntax element ivs_oup_num_points indicates the number of points in the point cloud to be generated for the current output unit from the reference point cloud renderer. The syntax element ivs_oup_extension_present_flag equal to equal to 0 specifies that no ivs_oup_extension_data_flag syntax elements are present in the syntax structure. ivs_oup_extension_present_flag equal to 1 specifies that there are ivs_oup_extension_data_flag syntax elements present syntax structure. Decoders conforming shall ignore all data that follow the value 1 for ivs_oup_extension_present_flag. The syntax element ivs_oup_extension_data_flag may have any value. Its presence and value do not affect decoder conformance to profiles. Decoders conforming to a profile shall ignore all ivs_oup_extension_data_flag syntax elements. The syntax element num_atlases_minus1 plus 1 indicates the number of atlases in the atlas list. The syntax element atlas_id[i] indicates the index of the i-th atlas. The syntax element num_patches_minus1[a] plus 1 indicates the number of patches in the a-th atlas. The syntax element atlas_width[a] indicates the width of the a-th atlas. It is a requirement of bitstream conformance that atlas_width[a] equal pic_width_in_luma_samples in the active SPS for the texture atlas component layer of the a-th atlas. The syntax element atlas_height[a] indicates the height of the a-th atlas. It is a requirement of bitstream conformance that atlas_height[a] equal pic_height_in_luma_samples in the active SPS for the texture atlas component layer of the a-th atlas. The syntax element cam_id[a][i] indicates the camera index associated with the i-th patch of the a-th atlas. The variable ViewId[a][i] is set equal to cam_view_id[cam_id[a][i]]. The syntax elements patch_width_in_view[a][i] and patch_height_in_view[a][i] specify the width and height in luma samples, respectively, of the i-th patch of the a-th atlas, within the ViewId[a][i]-th view. The number of bits used for the representation of patch_width_in_view[a][i] and patch_height_in_view[a][i] are Ceil(Log 2(projection_plane_width[ViewId[a][i])) and Ceil(Log 2(projection_plane_height[ViewId[a][i])) bits, respectively. The syntax elements patch_pos_in_atlas_x[a][i] and patch_pos_in_atlas_y[a][i] specify the horizontal and vertical coordinates in luma samples, respectively, of the top-left corner of the i-th patch of the a-th atlas. The number of bits used for the representation of patch_pos_in_atlas_x[a][i] and patch_pos_in_atlas_y[a][i] are Ceil (Log 2(atlas_width[a])) and Ceil(Log 2(atlas_height[a])), bits respectively. The syntax elements patch_pos_in_view_x [a][i] and patch_pos_in_view_y [a][i] specify the horizontal and vertical coordinates in luma samples, respectively, of the top-left corner of the i-th patch in the ViewId[a][i]-th view. The number of bits used for the representation of patch_pos_in_view_x [a][i] and patch_pos_in_view_y[a][i] are Ceil (Log 2(projection_plane_width[ViewId[a][i])) and Ceil Log 2(projection_plane_height[ViewId[a][i])) bits, respectively. The syntax element patch_rotation[a][i] indicates the rotation of the i-th patch in the a-th atlas relative to the orientation of the patch in the ViewId[a][i]-th view. patch_rotation[a][i] equal to 0 specifies no rotation. patch rotation[a][i] equal to 1 specifies a clockwise 90 degrees rotation be applied when mapping from the atlas to the view, as illustrated in FIG. 3. patch_rotation[a][i] equal to 2 specifies a clockwise 180 degrees rotation be applied when mapping from the atlas to the view. patch_rotation[a][i]

equal to 3 specifies a clockwise 270 degrees rotation be applied when mapping from the atlas to the view.

Figure 8:
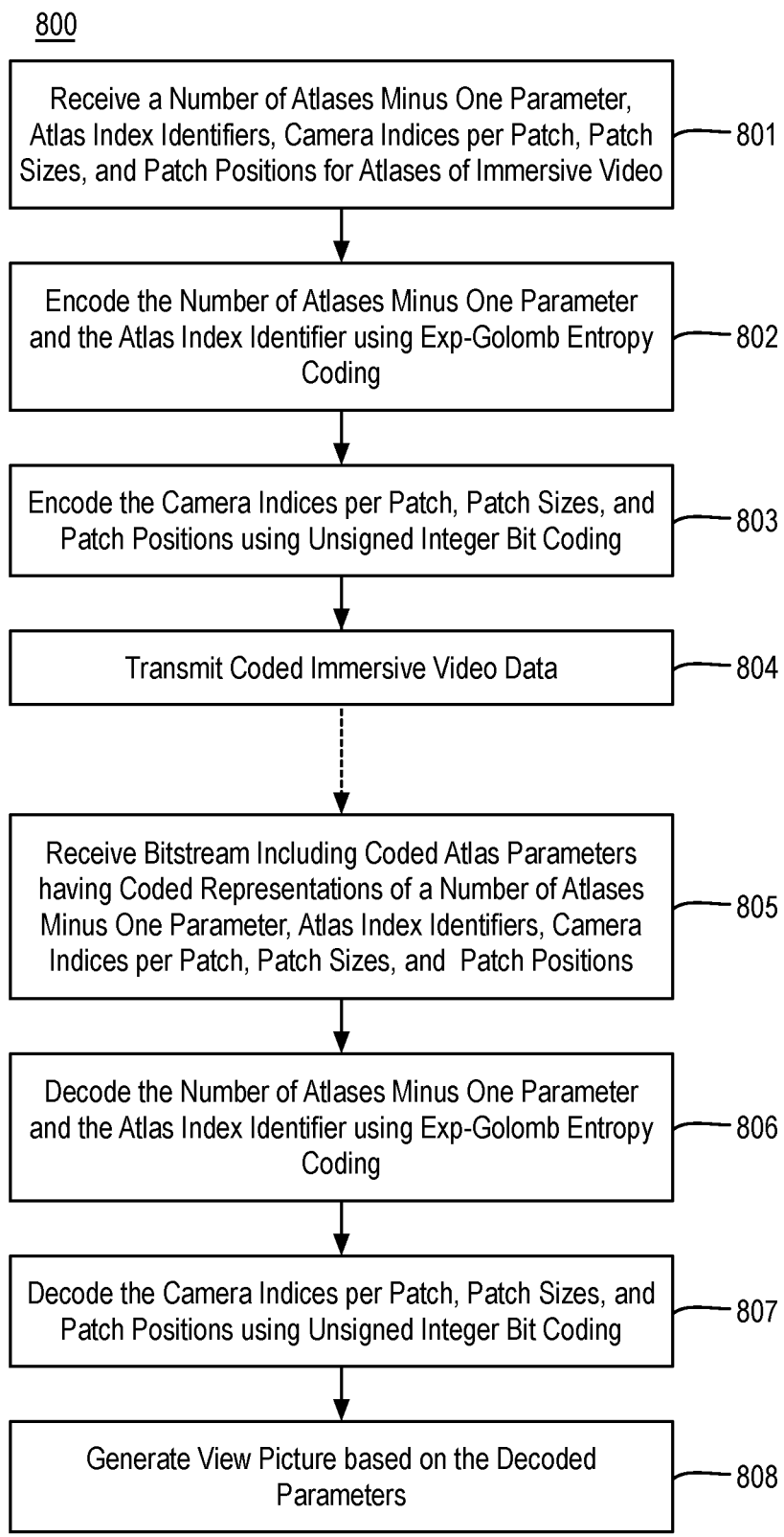
FIG. 8 is a flow diagram illustrating an example process 800 for immersive video coding including coding of atlas parameters.

FIG. 8 is a flow diagram illustrating an example process 800 for immersive video coding including coding of atlas parameters, arranged in accordance with at least some implementations of the present disclosure. Process 800 may include one or more operations 801-808 as illustrated in FIG. 8. Process 800 may be performed by any device of system discussed herein. In some embodiments, operations 801-804 are performed by an encoder and operations 805-808 are performed by a decoder.

Processing begins at operation 801, where, for a plurality of atlases corresponding to immersive video, atlas parameters including a number of atlases minus one parameter, atlas index identifiers, camera indices per patch (e.g., a camera index associated with a first patch of a first atlas, a camera index associated with a second patch of the first atlas, a camera index associated with a first patch of a second atlas, and so on), patch sizes, and patch positions are received. In some embodiments, the atlas parameters (e.g., atlas parameters 106) define patch size, location, corresponding view, and patch occupancy for atlas pictures as discussed herein.

Processing continues at operation 802, where some atlas parameters are encoded such that the number of atlases minus one parameter (num_atlases_minus1) and atlas index identifiers (atlas_id) are encoded using ue(v) coding as discussed herein. For example, the ue(v) coding provides Exp-Golomb entropy coding where the coding is based on a size (v) of another syntax element as discussed herein. Processing continues at operation 803, where other atlas parameters are encoded such that the camera indices per patch (cam_id), patch sizes (patch_width_in_view, patch_height_in_view), and patch positions (patch_pos_in_atlas_x, patch_pos_in_atlas_y, patch_pos_in_view_x, patch_pos_in_view_y) are coded using u(v) as discussed herein. For example, u(v) coding provides integer bit coding where the coding is based on a size (v) of another syntax element as discussed herein. Additional atlas parameters may be coded as described herein. Furthermore such coding dependency (v) is performed as described herein with respect to syntax elements. In some embodiments, the camera indices per patch are coded using an integer size (v) based on a number of cameras minus one parameter (e.g., a number of cameras in a camera array for the immersive video minus one; num_cameras_minus1) or a number of cameras (e.g., the number of cameras in the array). In some embodiments, the camera indices per patch are coded using an integer size (v) equal to a log base 2 of a number of cameras minus one parameter. In some embodiments, the camera indices per patch (the number of bits used for the representation of cam_id[a][i] are Ceil(Log 2(num_cameras_minus1)). In some embodiments, the camera indices per patch (the number of bits used for the representation of cam_id[a][i] are Ceil(Log 2(num_cameras_minus1+1)). Such integer sizes are also used in the decode discussed herein below.

Processing continues at operation 804, where the coded immersive data is transmitted to another device such as a decoder or a memory storage device. For example, the coded immersive data may be included into a bitstream and/or packetized and provided, in the compressed representation, to a decoder or a memory storage device (for eventual use by a decoder).

Processing continues at operation 805, where, for a number atlases corresponding to immersive video, a bitstream portion including coded atlas parameters including coded representations of a number of atlases minus one parameter and a camera index associated with a first patch of a first atlas of the plurality of atlases (e.g., an atlas index identifier). Furthermore, the bitstream portion may include coded representations of additional atlas index identifiers, camera indices per patch, patch sizes, and patch positions.

Processing continues at operation 806, where the coded representations of the number of atlases minus one parameter is decoded using Exp-Golomb entropy decoding (ue(v)) as discussed herein. Operation 806 may further include decoding the coded representation of the atlas index identifiers using Exp-Golomb entropy decoding (ue(v)). Processing continues at operation 807, where the camera index associated with the first patch of the first atlas of the plurality of atlases is decoded using integer bit decoding (u(v)), the integer bit decoding comprising an integer length based on the number of cameras minus one parameter as discussed with respect to encode. Operation 807 may further include decoding the patch size for the first patch using integer bit decoding. In some embodiments, the integer bit decoding based on the number of cameras (e.g., the number of cameras minus one parameter). In some embodiments, the integer bit decoding based on the projection plane size comprises integer bit decoding of the patch size at an integer size equal to a log base 2 of the number of cameras minus one parameter. In some embodiments, the integer bit decoding based on a projection plane size as described herein. In some embodiments, the integer bit decoding based on the projection plane size comprises integer bit decoding of the patch size at an integer size equal to a log base 2 of the projection plane size. In some embodiments, the projection plane size is a horizontal resolution of a camera projection plane. In some embodiments, the decoded patch size is a patch width in luma samples of the first patch of the first atlas.

Processing continues at operation 808, where one or more view pictures or representations are generated based on the decoded atlas parameters. For example, decoded atlas pictures may be accessed based on the decoded atlas parameters to populate one or more view pictures for use in a viewport generation.

Discussion now turns to an HEVC "Independent Layers Main 10" Profile according to some embodiments. In some embodiments, an "Independent Layers Main 10" HEVC profile is provided for a new revision of HEVC, and to be signaled in the VPS extension of the HEVC bitstream. This new profile allows a conforming HEVC bitstream to contain two or more independent layers. In some embodiments, the semantics for the Independent Layers Main 10 profile may be based on the semantics for the Multiview Main profile. In an embodiment, in this profile, direct_dependency_flag[i] [j] may be required to be equal to 0 for all values of i and j present in the bitstream. The specific wording of this restriction is provided in the profile description below.

In some embodiments, an Independent Layers Main 10 profile is provided as follows. For a layer in an output operation point associated with an OLS in a bitstream, the layer being conforming to the Independent Layers Main 10 profile, the following applies: let olsIdx be the OLS index of the OLS, the sub-bitstream subBitstream and the base layer sub-bitstream baseBitstream are derived. When vps_base_layer_internal_flag is equal to 1, the base layer sub-bitstream baseBitstream shall obey the following constraints: the base layer sub-bitstream baseBitstream shall be indicated to conform to the Main or Main 10 profile. The sub-bitstream subBitstream shall obey the following constraints: all active VPSs shall have vps_num_rep_ formats_minus1 in the range of 0 to 15, inclusive. All active SPSs for layers in subBitstream shall have chroma_format_idc equal to 1 only. All active SPSs for layers in subBitstream shall have transform_skip_rotation_enabled_flag, transform_skip_context_enabled_flag, implicit_rdpcm_enabled_flag, explicit_rdpcm_enabled_flag, extended_precision_processing_flag, intra_smoothing_disabled_flag, high_precision_offsets_enabled_flag, persistent_rice_adaptation_enabled_flag and cabac_bypass_alignment_enabled_flag, when present, equal to 0 only. CtbLog 2SizeY derived from all active SPSs for layers in subBitstream shall be in the range of 4 to 6, inclusive. All active PPSs for layers in subBitstream shall have log 2_max_transform_skip_block_size_minus2 and chroma_qp_offset_list_enabled_flag, when present, equal to 0 only. All active VPSs shall have alt_output_layer_flag[olsIdx] equal to 0 only. For a layer with nuh_layer_id iNuhLId equal to any value included in layerIdListTarget that was used to derive subBitstream, the value of direct_dependency_flag[iNuhLId][j] shall be equal to 0 for any value of j. All active SPSs for layers in subBitstream shall have sps_range_extension_flag and sps_scc_extension_flag equal to 0 only. All active PPSs for layers in subBitstream shall have pps_range_extension_flag and pps_scc_extension_flag equal to 0 only. All active SPSs for layers in subBitstream shall have bit_depth_luma_minus8 equal to 0 only. All active SPSs for layers in subBitstream shall have bit_depth_chroma_minus8 equal to 0 only. All active PPSs for layers in subBitstream shall have colour_mapping_enabled_flag equal to 0 only. When an active PPS for any layer in subBitstream has tiles_enabled_flag equal to 1, it shall have entropy_coding_sync_enabled_flag equal to 0. When an active PPS for any layer in subBitstream has tiles_enabled_flag equal to 1, ColumnWidthInLumaSamples[i] shall be greater than or equal to 256 for all values of i in the range of 0 to num_tile_columns_minus1, inclusive and RowHeightInLumaSamples[j] shall be greater than or equal to 64 for all values of j in the range of 0 to num_tile_rows_minus1, inclusive. The number of times read_bits(1) is called when parsing coding_tree_unit( ) data for any CTU shall be less than or equal to 5*RawCtuBits/3. General_level_idc and sub_layer_level_idc[i] for all values of i in active SPSs for any layer in subBitstream shall not be equal to 255 (which indicates level 8.5). The tier and level constraints specified for the Independent Layers Main 10 profile shall be fulfilled. In some embodiments, all syntax elements in the profile_tier_level( ) syntax structure refer to those in the profile_tier_level( ) syntax structure associated with the layer.

Conformance of a layer in an output operation point associated with an OLS in a bitstream to the Independent Layers Main 10 profile is indicated as follows. If OpTid of the output operation point is equal to vps_max_sub_layer_minus1, the conformance is indicated by general_profile_idc being equal to 6 or general_profile_compatibility_flag[6] being equal to 1 and general_max_12_bit_constraint_flag being equal to 1, general_max_10bit_constraint_flag being equal to 1, general_max_8bit_constraint_flag being equal to 1, general_max_422chroma_constraint_flag being equal to 1, general_max_420chroma_constraint_flag being equal to 1, general_max_monochrome_constraint_flag being equal to 0, general_intra_constraint_flag being equal to 0 and general_one_picture_only_constraint_flag being equal to 0 and general_lower_bit_rate_constraint_flag being equal to 1. Otherwise (OpTid of the output operation point is less than vps_max_sub_layer_minus1), the conformance is indicated by sub_layer_profile_idc[OpTid] being equal to 6 or sub_layer_profile_compatibility_flag[OpTid][6] being equal to 1 and sub_layer_max_12bit_constraint_flag[OpTid] being equal to 1, sub_layer_max_10bit_constraint_flag[OpTid] being equal to 1, sub_layer_max_8bit_constraint_flag[OpTid] being equal to 1, sub_layer_max_422chroma_constraint_flag[OpTid] being equal to 1, sub_layer_max_420chroma_constraint_flag[OpTid] being equal to 1, sub_layer_max_monochrome_constraint_flag[OpTid] being equal to 0, sub_layer_intra_constraint_flag[OpTid] being equal to 0 and sub_layer_one_picture_only_constraint_flag[OpTid] being equal to 0 and sub_layer_lower_bit_rate_constraint_flag[OpTid] being equal to 1.

Discussion now turns to a MIV "Immersive Main 10" Profile according to some embodiments. In some embodiments, an MIV "Immersive Main 10" profile is included in IV, to be signaled in the profile_tier_level( ) syntax structure. In some embodiments, this profile requires that HEVC be used for the video coding layers, and that all OLSes in the HEVC bitstream conform to the HEVC Independent Layers Main 10 profile. In some embodiments, the number of video codec layers in the bitstream is restricted to be less than ivs_max_codec_layers_minus1. In some embodiments, this profile requires picture coding order alignment between layers. In some embodiments, this profile requires that for each atlas, a layer group be present for each atlas, containing a texture component layer, depth component layer, and occupancy map component layer. In some embodiments, for each access unit, when a picture is present in the texture layer, a picture is also required to be present in the depth layer and occupancy map later. In some embodiments, the texture and depth layers are required to have the same coded picture resolution. In some embodiments, the occupancy map picture resolution is restricted to be equal to the coded pictures size of the corresponding texture and depth components, after adjusting for scaling and packing, if any. In some embodiments, no restrictions are placed on the value of ivs_points_rendering_idc in the bitstream, but no requirement is placed on decoder clients to implement rendering.

Discussion now turns to an Immersive Main 10 Profile according to some embodiments. In some embodiments, bitstreams conforming to the Immersive Main 10 profile shall obey the following constraints: IVS parameters shall have ivs_codec_id equal to HEVC; IVS parameters shall have ivs_all_codec_layers_au_aligned_flag equal to 1; all active SPSs for video codec layers in the bitstream shall have general_profile_idc equal to Main or Main 10; all active SPSs for video codec layers in the bitstream shall have general_tier_flag less than or equal to ivs_tier_flag; all active SPSs for video codec layers in the bitstream shall have general_level_idc less than or equal to ivs_ptl_max_layer_level_idc; all active VPSes in the video codec bitstream shall obey the following constraints: all OLSes shall conform to the Independent Layers Main 10 profile, vps_max_layers_minus1 shall be less than or equal to ivs_max_codec_layers_minus1, for any active texture layer, indicated by AtlasId equal to a, for any value of a, DepthFlag equal to 0, OccupancyFlag equal to 0, and an active SPS with pic_width_in_luma_samples equal to PicWidth and pic_height_in_luma_samples equal to PicHeight, for any values of PicWidth and PicHeight, there shall also be present in the bitstream the following: an active depth layer, with AtlasId equal to a, DepthFlag equal to 1, OccupancyFlag equal to 0, and an active SPS having pic_width_in_luma_samples equal to PicWidth<<occupancy_map_scaling, and pic_ height_in luma_samples equal to PicHeight<<occupancy_map_scaling and an active occupancy map layer with AtlasId equal to a, DepthFlag equal to 0, and OccupancyFlag equal to 1, and an active SPS having pic_width_in_luma_samples equal to occupancy_map_packing_flag? (PicWidth<<occupancy_map_scaling+7)/8:PicWidth<<occupancy_map_scaling, and pic_height_in luma_samples equal to PicHeight<<occupancy_map_scaling.

In some embodiments, conformance of a bitstream to the Immersive Main 10 profile is indicated by ivs_profile_idc being equal to 0. In some embodiments, decoders conforming to the Immersive Main 10 profile at a specific level (identified by a specific value of ivs_level_idc) of a specific tier (identified by a specific value of ivs_tier_flag) shall be capable of decoding all bitstreams and sub-layer representations for which all of the following conditions apply: the bitstream is indicated to conform to the Immersive Main 10 profile, the bitstream is indicated to conform to a level that is not level 8.5 and is lower than or equal to the specified level, the bitstream is indicated to conform to a tier that is lower than or equal to the specified tier.

Discussion now turns to a V-PCC "Point Cloud HEVC Main 10" Profile according to some embodiments. In some embodiments, a V-PCC "Point Cloud HEVC Main 10" profile is included in IV. In some embodiments, this profile requires that HEVC be used for the video coding layers, and that all OLSes in the HEVC bitstream conform to the HEVC Independent Layers Main 10 profile. In some embodiments, the number of video codec layers in the bitstream is restricted to be less than ivs_max_codec_layers_minus1. Unlike the Immersive Main 10 profile, in some embodiments, picture coding order alignment between layers is not required. In some embodiments, this profile requires that the bitstream be capable of enabling a renderer to generate a point cloud sequence through a rendering process, which exactly matches the point cloud sequence generated by the reference point cloud renderer.

In some embodiments, bitstreams conforming to the Point Cloud HEVC Main 10 profile shall obey the following constraints: IVS parameters shall have ivs_codec_id equal to HEVC; IVS parameters shall have ivs_rendering_idc equal to 1; all active SPSs for video codec layers in the bitstream shall have general tier idc less than or equal to ivs_tier_flag; all active SPSs for video codec layers in the bitstream shall have general_level_idc less than or equal to ivs_ptl_max_layer_level_idc; all active SPSs for video codec layers in the bitstream shall have general_level_idc less than or equal to ivs_ptl_max_layer_level_idc; all active VPSes in the bitstream shall obey the following constraints: all OLSes shall conform to the Independent Layers Main 10 profile, vps_max_layers_minus1 shall be less than or equal to ivs_max_codec_layers_minus1, for any active texture layer, indicated by AtlasId equal to a, for any value of a, DepthFlag equal to 0, OccupancyFlag equal to 0, and an active SPS with pic_width_in_luma_samples equal to PicWidth and pic_height_in_luma_samples equal to PicHeight, for any values of PicWidth and PicHeight, there shall also be present in the bitstream the following: an active depth layer, with AtlasId equal to a, DepthFlag equal to 1, OccupancyFlag equal to 0 and an active occupancy map layer with AtlasId equal to a, DepthFlag equal to 0, and OccupancyFlag equal to 1.

In some embodiments, conformance of a bitstream to the Point Cloud HEVC Main 10 profile is indicated by ivs_profile_idc being equal to 1. In some embodiments, decoders conforming to the Point Cloud HEVC Main 10 profile at a specific level (identified by a specific value of ivs_level_idc) of a specific tier (identified by a specific value of ivs_tier_flag) shall be capable of decoding all bitstreams and sub-layer representations for which all of the following conditions apply: the bitstream is indicated to conform to the Point Cloud HEVC Main 10 profile, the bitstream is indicated to conform to a level that is not level 8.5 and is lower than or equal to the specified level, and the bitstream is indicated to conform to a tier that is lower than or equal to the specified tier.

In some embodiments, renderers conforming to the Point Cloud HEVC Main 10 profile at a specific rendering level (identified by a specific value of ivs_points_level_idc) of a specific rendering tier (Main or Reduced), shall be capable of generating a point cloud from the decoder output decoding all bitstreams representations for which all of the following conditions apply: the bitstream is indicated to conform to ivs_points_level_idc, when ivs_points_rendering_idc is equal to 2 and the renderer conforms to the Main rendering tier: for each output unit, the renderer shall generate a point cloud with an exact match to the point cloud generated by the reference renderer, when ivs_points_rendering_idc is equal to 1 or 2 and the renderer conforms to the Reduced rendering tier: for each output unit, the renderer shall generate a point cloud containing at least 50% of the number of points generated by the reference renderer.

In some embodiments, IV requires some modifications of HEVC, as listed follows: allocation of NUT value for MIV, allocation of VPS Extension ScalabilityId types, and definition of Independent Layers Main 10 profile. Notable differences between the enclosed embodiments and the MIV WD1 include the following: occupancy map coded explicitly, rather than embedded in depth, optional packing of occupancy map bits, to reduce sample rate in lossless mode, explicit signaling of threshold, in lossy mode, definition of Immersive Main 10 profile, specific usage of VPS extension for layers, migration of camera parameters list into IVS parameters, and minor syntax modifications, migration of atlas parameters list into MIV output unit parameters syntax structures, and minor syntax modifications. Notable differences between the enclosed embodiments and V-PCC include the following: limitation to use one video codec standard with multi-layer support for all video codec layers, definition of IVS, with multi-layer IRAP alignment requirement, definition of IV output unit, with required outputs for each output unit, including atlas patch occupancy map, atlas parameters list from MIV WD1 in initial specification, with further study of V-PCC SCD patch params data to explore consolidation or separate signaling, removal of some high level syntax from V-PCC SCD, relying instead on the multi-layer video codec high level syntax, definition of IVS parameters and IV output unit parameters syntax structures, occupancy map changes (definition of scaling method for purposes of atlas patch occupancy map generation and optional packing of occupancy map for lossless mode), profile definitions (requirement of point cloud rendering as decoder/renderer client conformance rather than bitstream conformance, definition of Point Cloud HEVC Main 10 profile, definition of Immersive Main 10 profile, which can be used for V-PCC use cases, with some restriction of flexibility from the V-PCC SCD), and other V-PCC SCD features that may be to be integrated.

The disclosed embodiments may be implemented via any encoder and/or decoder, which may in turn be implemented via any suitable system structure or platform and in any suitable form factor device such as a server computer, a cloud computing environment, personal computer, a laptop computer, a tablet, a phablet, a smart phone, a gaming console, a wearable device, a display device, an all-in-one device, a two-in-one device, or the like.

Figure 9:
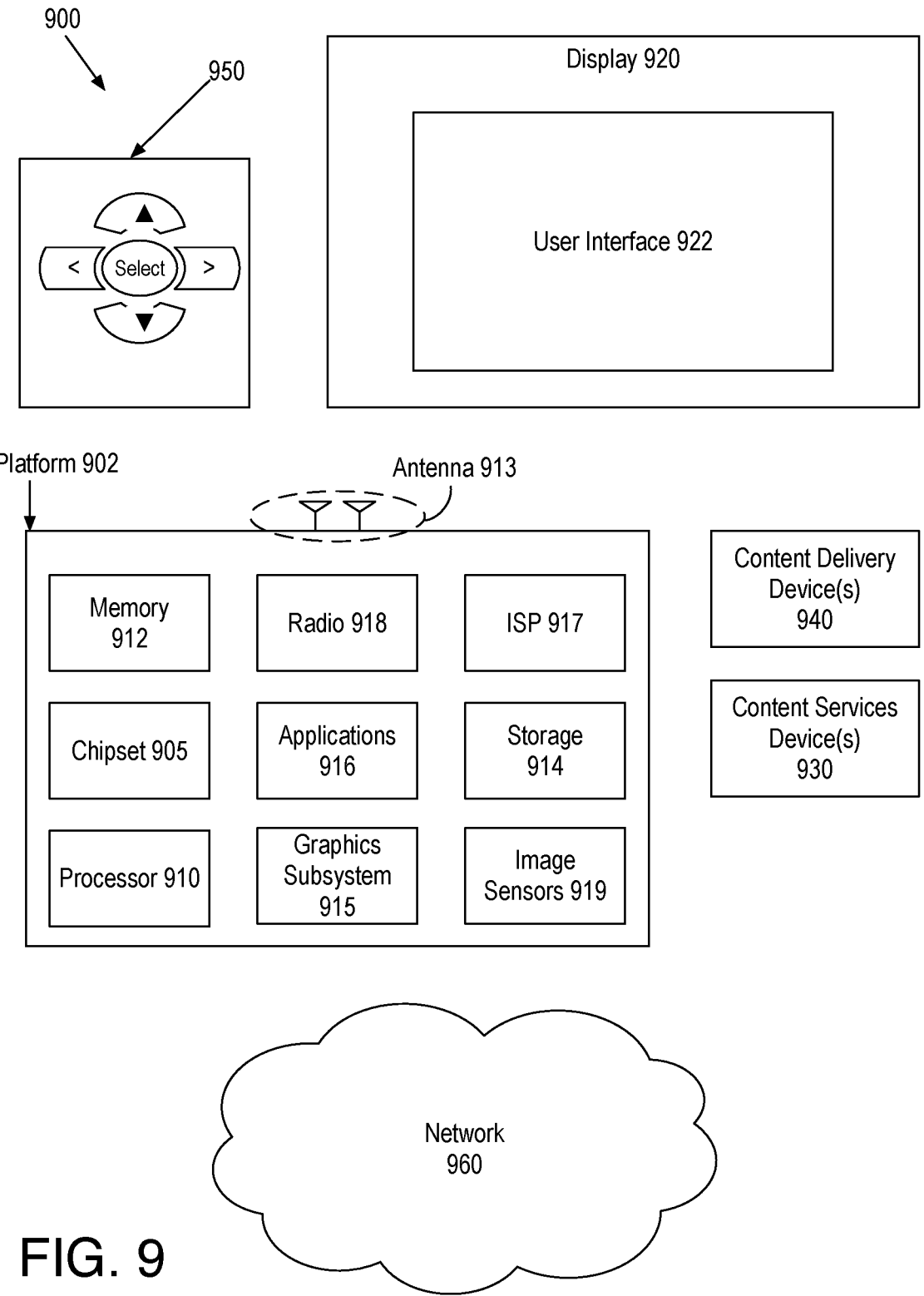
FIG. 9 is an illustrative diagram of an example system.

FIG. 9 is an illustrative diagram of an example system 900, arranged in accordance with at least some implementations of the present disclosure. In various implementations, system 900 may be a mobile device system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 900 includes a platform 902 coupled to a display 920. Platform 902 may receive content from a content device such as content services device(s) 930 or content delivery device(s) 940 or other content sources such as image sensors 919. For example, platform 902 may receive image data as discussed herein from image sensors 919 or any other content source. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916, image signal processor 917 and/or radio 918. Chipset 905 may provide intercommunication among processor 910, memory 912, storage 914, graphics subsystem 915, applications 916, image signal processor 917 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Image signal processor 917 may be implemented as a specialized digital signal processor or the like used for image processing. In some examples, image signal processor 917 may be implemented based on a single instruction multiple data or multiple instruction multiple data architecture or the like. In some examples, image signal processor 917 may be characterized as a media processor. As discussed herein, image signal processor 917 may be implemented based on a system on a chip architecture and/or based on a multi-core architecture.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

Image sensors 919 may include any suitable image sensors that may provide image data based on a scene. For example, image sensors 919 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 919 may include any device that may detect information of a scene to generate image data.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of navigation controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, navigation controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off" In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
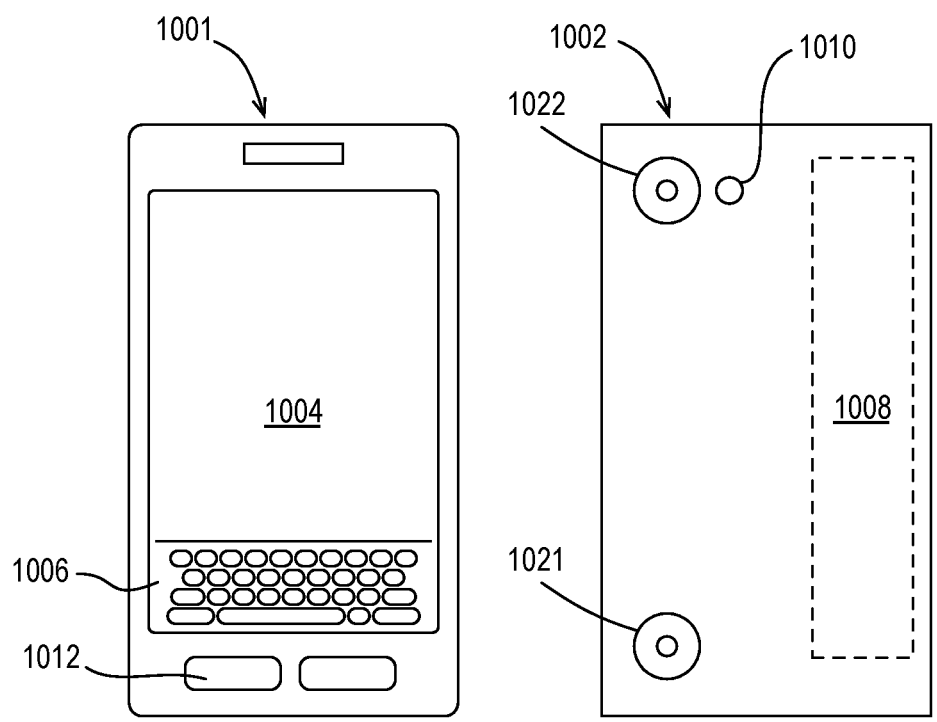
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, other systems, components, or modules discussed herein or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. pointand-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, a color camera 1021, a color camera 1022, and an integrated antenna 1008. In some embodiments, color camera 1021 and color camera 1022 attain planar images as discussed herein. In some embodiments, device 1000 does not include color camera 1021 and 1022 and device 1000 attains input image data (e.g., any input image data discussed herein) from another device. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include color cameras 1021, 1022, and a flash 1010 integrated into back 1002 (or elsewhere) of device 1000. In other examples, color cameras 1021, 1022, and flash 1010 may be integrated into front 1001 of device 1000 or both front and back sets of cameras may be provided. Color cameras 1021, 1022 and a flash 1010 may be components of a camera module to originate color image data with IR texture correction that may be processed into an image or streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for immersive video coding comprises receiving one or more of a sequence of depth atlas pictures, a sequence of texture atlas pictures, and a sequence of occupancy map atlas pictures representative of immersive video, coding the one or more sequences of depth atlas pictures, texture atlas pictures, and occupancy map atlas pictures with a video encoder to provide coded immersive video data comprising a plurality of output times each corresponding to individual ones of the pictures of the one or more sequences, wherein for each of a subset of the output times, the coded immersive video data comprises an intra coded picture for one or more of a coded depth atlas picture, a coded texture atlas picture, and a coded occupancy map atlas picture, and transmitting the coded immersive video data.

In one or more second embodiments, further to the first embodiment, the subset of output times comprise random access points to access the immersive video provided at intervals within the output times and the intra coded picture for one or more of the coded depth atlas picture, the coded texture atlas picture, and the coded occupancy map atlas picture comprises the intra coded picture for each of the coded depth atlas picture, the coded texture atlas picture, and the coded occupancy map atlas picture.

In one or more third embodiments, further to the first or second embodiments, each of the subset of the output times corresponds to an output unit comprising one or more of the intra coded depth atlas picture, intra coded texture atlas picture, and intra coded occupancy map atlas picture.

In one or more fourth embodiments, further to any of the first through third embodiments, the coded immersive video data further comprises an intra coded additional attributes atlas picture corresponding to the intra coded depth atlas picture, intra coded texture atlas picture, and intra coded occupancy map atlas picture.

In one or more fifth embodiments, further to any of the first through fourth embodiments, the coded immersive video data further comprises an atlas parameter list corresponding to the intra coded depth atlas picture, intra coded texture atlas picture, and intra coded occupancy map atlas picture.

In one or more sixth embodiments, a method for immersive video coding comprises receiving coded immersive video data comprising a plurality of output times each corresponding to individual ones of pictures of one or more of a sequence of depth atlas pictures, a sequence of texture atlas pictures, and a sequence of occupancy map atlas pictures representative of immersive video, decoding the coded immersive video data to generate the sequence of depth atlas pictures, the sequence of texture atlas pictures, and the sequence of occupancy map atlas pictures, wherein for each of a subset of the output times, the decoded sequences comprise an intra coded picture for each of a coded depth atlas picture, a corresponding coded texture atlas picture, and a corresponding coded occupancy map atlas picture, and preparing a presentation for a viewer using the decoded sequences.

In one or more seventh embodiments, further to the sixth embodiment, the subset of output times comprise random access points to access the immersive video provided at intervals within the output times and the method further comprises monitoring the coded immersive video data for a first random access point, wherein said decoding is responsive to the first random access point.

In one or more eighth embodiments, further to the sixth or seventh embodiments, each of the subset of the output times corresponds to an output unit comprising the intra coded depth atlas picture, intra coded texture atlas picture, and intra coded occupancy map atlas picture.

In one or more ninth embodiments, further to any of the sixth through eighth embodiments, the coded immersive video data further comprises an intra coded additional attributes picture corresponding to the intra coded depth atlas picture, intra coded texture atlas picture, and intra coded occupancy map atlas picture.

In one or more tenth embodiments, further to any of the sixth through ninth embodiments, the coded immersive video data further comprises an atlas parameter list corresponding to the intra coded depth atlas picture, intra coded texture atlas picture, and intra coded occupancy map atlas picture.

In one or more eleventh embodiments, a method for immersive video coding comprises receiving, for a plurality of cameras corresponding to immersive video, a plurality of camera parameters to signal intrinsic parameters and extrinsic parameters of the plurality of cameras, wherein the camera parameters are absent one or more first intrinsic parameters for at least some of the plurality of cameras, determining, using the plurality of camera parameters, decoded intrinsic and extrinsic camera parameters for each of the plurality of cameras by decoding a first decoded intrinsic parameter for a first camera of the plurality of cameras from the plurality of camera parameters and applying the first decoded intrinsic parameter to each of the plurality of cameras, and preparing a presentation for a viewer using the decoded intrinsic and extrinsic camera parameters.

In one or more twelfth embodiments, further to the eleventh embodiment, the camera parameters are absent one or more orientation parameters for any of the plurality of cameras and the method further comprises applying a first orientation parameter to each of the plurality of cameras as a default parameter based on the absence of the first extrinsic parameters.

In one or more thirteenth embodiments, further to the eleventh or twelfth embodiments, the first decoded intrinsic parameter comprises one of a projection method, a projection plane width, a longitudinal range, a field of view, or a focal length.

In one or more fourteenth embodiments, further to any of the eleventh through thirteenth embodiments, the method further comprises receiving, for the plurality of cameras, a camera position granularity value representative of displacement of the cameras for each axis in a global reference coordinate system, the camera position granularity values to indicate a signaling precision of camera positions in the global reference coordinate system corresponding to the immersive video, receiving a camera position units value for each axis for a first camera of the plurality of cameras, each camera position units value to indicate a position of the first camera in the global reference coordinate system based on the camera position granularity values, and determining a position of the first camera in the global reference system based on the camera position granularity values and the camera position units value.

In one or more fifteenth embodiments, further to any of the eleventh through fourteenth embodiments, the camera position granularity values are fixed point values and determining the position of the first camera in the global reference system comprises multiplying each camera position granularity value by each camera position units value for the first camera to determine the position of the first camera in the global reference coordinate system.

In one or more sixteenth embodiments, further to any of the eleventh through fifteenth embodiments, the plurality of camera parameters comprise an intrinsic camera parameters equal flag for the plurality of cameras, wherein applying the first decoded intrinsic parameter to each of the plurality of cameras is responsive to the intrinsic camera parameters equal flag.

In one or more seventeenth embodiments, further to any of the eleventh through sixteenth embodiments, the method further comprises receiving depth quantization parameters for the first camera and a depth quantization parameters equal flag for the plurality of cameras and assigning the depth quantization parameters to each of the plurality of cameras in response to the depth quantization parameters equal flag.

In one or more eighteenth embodiments, a method for immersive video coding comprises receiving, for a plurality of atlases corresponding to immersive video, a bitstream portion comprising coded atlas parameters comprising coded representations of at least a number of atlases minus one parameter and a camera index associated with a first patch of a first atlas of the plurality of atlases, decoding the coded representation of the number of atlases minus one parameter, decoding the coded representation of the camera index associated with the first patch of the first atlas of the plurality of atlases using integer bit decoding, the integer bit decoding comprising an integer length based on a number of cameras minus one parameter, and generating at least one view picture based on the plurality of atlases, the decoded number of atlases minus one parameter, and the camera index associated with the first patch of the first atlas of the plurality of atlases.

In one or more nineteenth embodiments, further to the eighteenth embodiment, the coded representations further comprises a patch size for the first patch and the method further comprises decoding the coded representation of the patch size for the first patch using integer bit decoding, the integer bit decoding based on the number of cameras minus one parameter.

In one or more twentieth embodiments, further to the eighteenth or nineteenth embodiments, the integer bit decoding based on the number of cameras minus one parameter comprises integer bit decoding of the patch size at an integer size equal to a log base 2 of the number of cameras minus one parameter.

In one or more twenty-first embodiments, a device or system includes a memory and a processor to perform a method according to any one of the above embodiments.

In one or more twenty-second embodiments, at least one machine readable medium includes a plurality of instructions that in response to being executed on a computing device, cause the computing device to perform a method according to any one of the above embodiments.

In one or more twenty-third embodiments, an apparatus includes means for performing a method according to any one of the above embodiments.

It will be recognized that the embodiments are not limited to the embodiments so described, but can be practiced with modification and alteration without departing from the scope of the appended. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for immersive video coding, comprising:
receiving one or more of a sequence of depth atlas pictures, a sequence of texture atlas pictures, and a sequence of occupancy map atlas pictures representative of immersive video;
coding the one or more sequences of depth atlas pictures, texture atlas pictures, and occupancy map atlas pictures with a video encoder to provide coded immersive video data comprising a plurality of output times each corresponding to individual ones of the pictures of the one or more sequences, wherein, for each of a subset of the output times, the coded immersive video data comprises an intra coded picture for one or more of a coded depth atlas picture, a coded texture atlas picture, and a coded occupancy map atlas picture; and
transmitting the coded immersive video data.

2. The method of claim 1, wherein the subset of output times comprise random access points to access the immersive video provided at intervals within the output times and the intra coded picture for one or more of the coded depth atlas picture, the coded texture atlas picture, and the coded occupancy map atlas picture comprises the intra coded picture for each of the coded depth atlas picture, the coded texture atlas picture, and the coded occupancy map atlas picture.

3. The method of claim 1, wherein each of the subset of the output times corresponds to an output unit comprising the intra coded picture for one or more of the coded depth atlas picture, the coded texture atlas picture, and the coded occupancy map atlas picture.

4. The method of claim 1, wherein the coded immersive video data further comprises an intra coded additional attributes atlas picture corresponding to the intra coded picture for the coded depth atlas picture, the coded texture atlas picture, and the coded occupancy map atlas picture.

5. The method of claim 1, wherein the coded immersive video data further comprises an atlas parameter list corresponding to the intra coded picture for the coded depth atlas picture, the coded texture atlas picture, and the coded occupancy map atlas picture.

6. A method for immersive video coding, comprising:
receiving coded immersive video data comprising a plurality of output times each corresponding to individual ones of pictures of one or more of a sequence of depth atlas pictures, a sequence of texture atlas pictures, and a sequence of occupancy map atlas pictures representative of immersive video;
decoding the coded immersive video data to generate decoded sequences of the depth atlas pictures, the texture atlas pictures, and the occupancy map atlas pictures, wherein, for each of a subset of the output times, the decoded sequences comprise an intra coded depth atlas picture, a corresponding intra coded texture atlas picture, and a corresponding intra coded occupancy map atlas picture; and
preparing a presentation for a viewer using the decoded sequences.

7. The method of claim 6, wherein the subset of output times comprises random access points to access the immersive video provided at intervals within the output times, the method further comprising:
monitoring the coded immersive video data for a first random access point, wherein said decoding is responsive to the first random access point.

8. The method of claim 6, wherein each output time of the subset of the output times corresponds to an output unit comprising the intra coded depth atlas picture, the intra coded texture atlas picture, and the intra coded occupancy map atlas picture.

9. The method of claim 6, wherein the coded immersive video data further comprises an intra coded additional attributes picture corresponding to the intra coded depth atlas picture, intra coded texture atlas picture, and intra coded occupancy map atlas picture.

10. The method of claim 6, wherein the coded immersive video data further comprises an atlas parameter list corresponding to the intra coded depth atlas picture, intra coded texture atlas picture, and intra coded occupancy map atlas picture.

* * * * *